US008186581B2

(12) United States Patent
Kurzweil et al.

(10) Patent No.: US 8,186,581 B2
(45) Date of Patent: May 29, 2012

(54) DEVICE AND METHOD TO ASSIST USER IN CONDUCTING A TRANSACTION WITH A MACHINE

(75) Inventors: Raymond C. Kurzweil, Newton, MA (US); Paul Albrecht, Bedford, MA (US); James Gashel, Baltimore, MD (US); Lucy Gibson, Belmont, MA (US)

(73) Assignee: K-NFB Reading Technology, Inc., Wellesley Hills, MA (US)

( * ) Notice: Subject to any disclaimer, the term of this patent is extended or adjusted under 35 U.S.C. 154(b) by 20 days.

(21) Appl. No.: 12/652,104

(22) Filed: Jan. 5, 2010

(65) Prior Publication Data

US 2010/0266205 A1 Oct. 21, 2010

Related U.S. Application Data

(63) Continuation of application No. 11/096,714, filed on Apr. 1, 2005, now Pat. No. 7,641,108.

(60) Provisional application No. 60/559,091, filed on Apr. 2, 2004.

(51) Int. Cl.
*G06K 5/00* (2006.01)

(52) U.S. Cl. ........................................ 235/380; 235/379

(58) Field of Classification Search .................. 235/380, 235/379, 381, 451; 340/571.4; 705/43
See application file for complete search history.

(56) References Cited

U.S. PATENT DOCUMENTS

| | | |
|---|---|---|
| 4,980,706 A | 12/1990 | Someya |
| 5,233,333 A | 8/1993 | Borsuk |
| 5,475,399 A | 12/1995 | Borsuk |
| 5,586,196 A | 12/1996 | Sussman |
| 5,633,727 A | 5/1997 | Shimoda |
| 5,737,056 A | 4/1998 | Martin et al. |
| 5,761,344 A | 6/1998 | Al-Hussein |
| 5,809,167 A | 9/1998 | Al-Hussein |
| 5,875,428 A | 2/1999 | Kurzweil et al. |
| 6,005,679 A | 12/1999 | Haneda |
| 6,026,177 A | 2/2000 | Mong et al. |
| 6,033,224 A | 3/2000 | Kurzweil et al. |
| 6,052,663 A | 4/2000 | Kurzweil et al. |
| 6,061,666 A | 5/2000 | Do et al. |
| 6,083,270 A | 7/2000 | Scott |
| 6,115,482 A | 9/2000 | Sears et al. |

(Continued)

OTHER PUBLICATIONS

Jul. 1999—Simon Sees—Goals for a General Purpose Reading Device for the Visually Impaired, Presented at the 12th Annual NACCQ conf., Dr. Samuel Mann et al.

(Continued)

*Primary Examiner* — Karl D. Frech

(74) *Attorney, Agent, or Firm* — Fish & Richardson P.C.

(57) ABSTRACT

A device for assisting a user to perform a transaction on a machine is described. The device receives data that specifies a transaction mode to use for processing an image and accesses a knowledge base to provide data to configure the device for the transaction mode, the data including data specific to the transaction mode. The device receives an image or images of a portion of a machine that the user will use to perform the transaction and processes the image or images to identify a pattern of controls on the machine and to detect the presence of a user-controlled pointing item over controls on the machine. The device announces to the user the name or function of the control closest to an end of the user-controlled pointing item.

31 Claims, 28 Drawing Sheets

U.S. PATENT DOCUMENTS

| | | | |
|---|---|---|---|
| 6,125,347 A | 9/2000 | Cote et al. | |
| 6,151,423 A | 11/2000 | Melen | |
| 6,159,013 A | 12/2000 | Parienti | |
| 6,173,264 B1 | 1/2001 | Kurzweil et al. | |
| 6,199,042 B1 | 3/2001 | Kurzweil | |
| 6,256,610 B1 | 7/2001 | Baum | |
| 6,304,313 B1 | 10/2001 | Honma | |
| 6,363,488 B1 | 3/2002 | Ginter et al. | |
| 6,473,523 B1 | 10/2002 | Newman et al. | |
| 6,477,493 B1 | 11/2002 | Brooks et al. | |
| 6,587,583 B1 | 7/2003 | Kurzweil et al. | |
| 6,640,304 B2 | 10/2003 | Ginter et al. | |
| 6,748,111 B1 | 6/2004 | Stolin et al. | |
| 6,810,401 B1 | 10/2004 | Thompson et al. | |
| 6,812,995 B2 | 11/2004 | Honma | |
| 6,823,084 B2 | 11/2004 | Myers et al. | |
| 7,175,076 B1 | 2/2007 | Block et al. | |
| 7,346,495 B1 | 3/2008 | Zhao et al. | |
| 7,641,108 B2 * | 1/2010 | Kurzweil et al. | 235/380 |
| 2001/0056342 A1 | 12/2001 | Peihn et al. | |
| 2002/0071277 A1 | 6/2002 | Starner et al. | |
| 2002/0091991 A1 | 7/2002 | Castro | |
| 2002/0158815 A1 | 10/2002 | Zwern | |
| 2003/0058111 A1 | 3/2003 | Lee et al. | |
| 2003/0076318 A1 | 4/2003 | Shaw-Weeks | |
| 2003/0098803 A1 | 5/2003 | Gourgey | |
| 2003/0134256 A1 | 7/2003 | Tretiakoff | |
| 2003/0164819 A1 | 9/2003 | Waibel | |
| 2003/0195749 A1 | 10/2003 | Schuller | |
| 2004/0072134 A1 | 4/2004 | Takahashi | |
| 2004/0078416 A1 | 4/2004 | Kawasaki et al. | |
| 2004/0098262 A1 | 5/2004 | Philbert | |
| 2004/0191731 A1 | 9/2004 | Stork | |
| 2007/0061487 A1 | 3/2007 | Moore et al. | |
| 2007/0080215 A1 | 4/2007 | Ramachandran et al. | |
| 2007/0087756 A1 | 4/2007 | Hoffberg | |
| 2007/0269139 A1 | 11/2007 | Erol | |
| 2008/0005147 A1 | 1/2008 | Khushraj et al. | |

OTHER PUBLICATIONS

2000—A Language Model Based Optical Character Recognizer (OCR) for Reading Incidental Text, Proceedings of NACCQ 2000, Dr. Malcolm McQueen.

2001—An Automatic Sign Recognition and Translation System, PUI 2001, Gregory Myers et al.

2001—Recognition of Text in 3-D Scenes, Gregory Myers et al.

2003—New Navigation Tool Offers a Virtual World for the Blind, Aug. 2002, EurekAlert.

2003—Digital Camera Translates in a Snap—BBC News.

2002—Automatic Sign Translation, Jing Zhang et al.

2002—Automatic Detection of Signs with Affine Transformation, Jing Zhang et al.

2002—A Robust Approach for Recognition of Text Embedded in Natural Scenes, Jing Zhang et al.

2002—A PDA-based Sign Translator, Jing Zhang et al.

2001—Translation of Foreign Road Signs Using a Personal Digital Assistant, Vinu Pattery.

2001—Towards Automatic Sign Translation, Jie Yang et al.

2001—Smart Configurable Reader for the Blind, Shawki Areibi et al.

\* cited by examiner

DEVICE AND METHOD TO ASSIST USER IN CONDUCTING A TRANSACTION WITH A MACHINE

CROSS-REFERENCE TO RELATED APPLICATIONS

This application is a continuation application (and claims the benefit of priority under 35 U.S.C. 120) of U.S. application Ser. No. 11/096,714, filed on Apr. 1, 2005 now U.S. Pat. No. 7,641,108, which claims the benefit of prior U.S. Provisional Application Ser. No. 60/559,091, filed on Apr. 2, 2004. The entire contents of the prior applications are herein incorporated by reference.

This application claims priority to and incorporates by reference in its entirety, U.S. Provisional Patent Application No. 60/559,091, filed Apr. 2, 2004 and entitled "Portable Reading Machines For Visually Impaired Persons."

BACKGROUND

Reading machines use optical character recognition (OCR) and text-to-speech (TTS) i.e., speech synthesis software to read aloud and thus convey printed matter to visually and developmentally impaired individuals. Reading machines read text from books, journals, and so forth.

Reading machines can use commercial off-the-shelf flatbed scanners, a personal computer and the OCR software. Such a reading machine allows a person to open a book and place the book face down on the scanner. The scanner scans a page from the book and the computer with the OCR software processes the image scanned, producing a text file. The text file is read aloud to the user using text-to-speech software.

SUMMARY

Reading can be viewed broadly as conveying content of a scene to a user. Reading can use optical mark recognition, face recognition, or any kind of object recognition. A scene can represent contents of an image that is being read. A scene can be a memo or a page of a book, or it can be a door in a hallway of an office building. The type of real-world contexts to "read" include visual elements that are words, symbols or pictures, colors and so forth.

According to an aspect of the present invention, a computer program product residing on a computer readable medium for assisting a user of a device to use the device to perform a transaction on a machine, includes instructions to receive data that specifies a transaction mode to use for processing an image and access a knowledge base to provide data to configure the computer program product for the transaction mode, the data including data specific to the transaction mode. The computer program product also includes instructions to receive an image or images of a portion of a machine that the user will use to perform the transaction, process the image or images to identify a pattern of controls on the machine and to detect the presence of a user-controlled pointing item over controls on the machine and announce to the user the name or function of the control closest to an end of the user-controlled pointing item.

The following are within the scope of the present invention. The machine is an automatic teller machine (ATM), e-ticket machine, electronic voting machines, or credit/debit point of sale machine. The machine has a layout of controls and the layout is included in data retrieved from the knowledge base. The instructions to process the image include instructions to process the image to recognize the controls on the machine in the image of the machine by comparing the layout to a stored representation of the layout for the machine. The instructions to process the image include instructions to process the image with character recognition to recognize text on controls in the image of the machine and convert text to speech to read the text on the controls in the image to the user. The computer program product includes instructions to guide the user in operation of the machine. The instructions to guide the user announce to the user the function of a control over which the user-controlled pointing item is placed. The instructions determine whether the user controlled pointing item is over a control, and if not, announce to the user to move the user-controlled pointing item. The instructions include instructions to announce to the user to move the user-controlled pointing item and determine where the location of the user-controlled pointing item in the image relative to a selected control in the image. The computer program product retrieves a stored template to recognize the layout and processes the image according to the stored template to navigate the user through use of the machine. The computer program product processes a signal from an RFID tag reader that receives a signal from an RFID tag on the machine to provide a specific description of the layout of controls on the machine.

According to an additional aspect of the present invention, a method of operating a device includes receiving data by the device that specifies a transaction mode to use for operating the device and accessing a knowledge base to provide data to configure the device for the transaction mode, the data including data specific to the transaction mode. The method also includes receiving an image or images of a portion of a machine that the user will use to perform the transaction, processing the image or images to identify a pattern of controls on the machine and to detect the presence of a user-controlled pointing item over controls on the machine, and announcing to the user the name or function of the control closest to an end of the user-controlled pointing item.

According to an additional aspect of the present invention, an apparatus includes a computing device, an image input device and a computer readable medium storing a computer program product assisting a user of the apparatus to use the apparatus to perform a transaction with a machine. The computer program product includes instructions for causing the computing device to receive data that specifies a transaction mode, access a knowledge base to provide data to configure the apparatus for the transaction mode, the data including data specific to the transaction mode and receive an image or images from the image input device the image or images being of a portion of a machine that the user will use to perform the transaction. The computer program product also includes instructions to process the image or images to identify a pattern of controls on the machine and to detect the presence of a user-controlled pointing item over controls on the machine and announce to the user the name or function of the control closest to an end of the user-controlled pointing item.

One or more aspects of the invention may provide one or more of the following advantages.

The reading device determines various characteristics of the captured image to inform the user of identified controls that were recognized by the device. This allows the user to use the device as an aid to help the user perform a transaction with a machine such as an automatic teller machine (ATM), e-ticket machine, electronic voting machine, credit/debit point of sale machine, and so forth. This device gives users such as blind or visually impaired persons additional autonomy.

The details of one or more embodiments of the invention are set forth in the accompanying drawings and the description below. Other features, objects, and advantages of the invention will be apparent from the description and drawings, and from the claims.

DETAILED DESCRIPTION

Hardware Configurations

Figure 1:
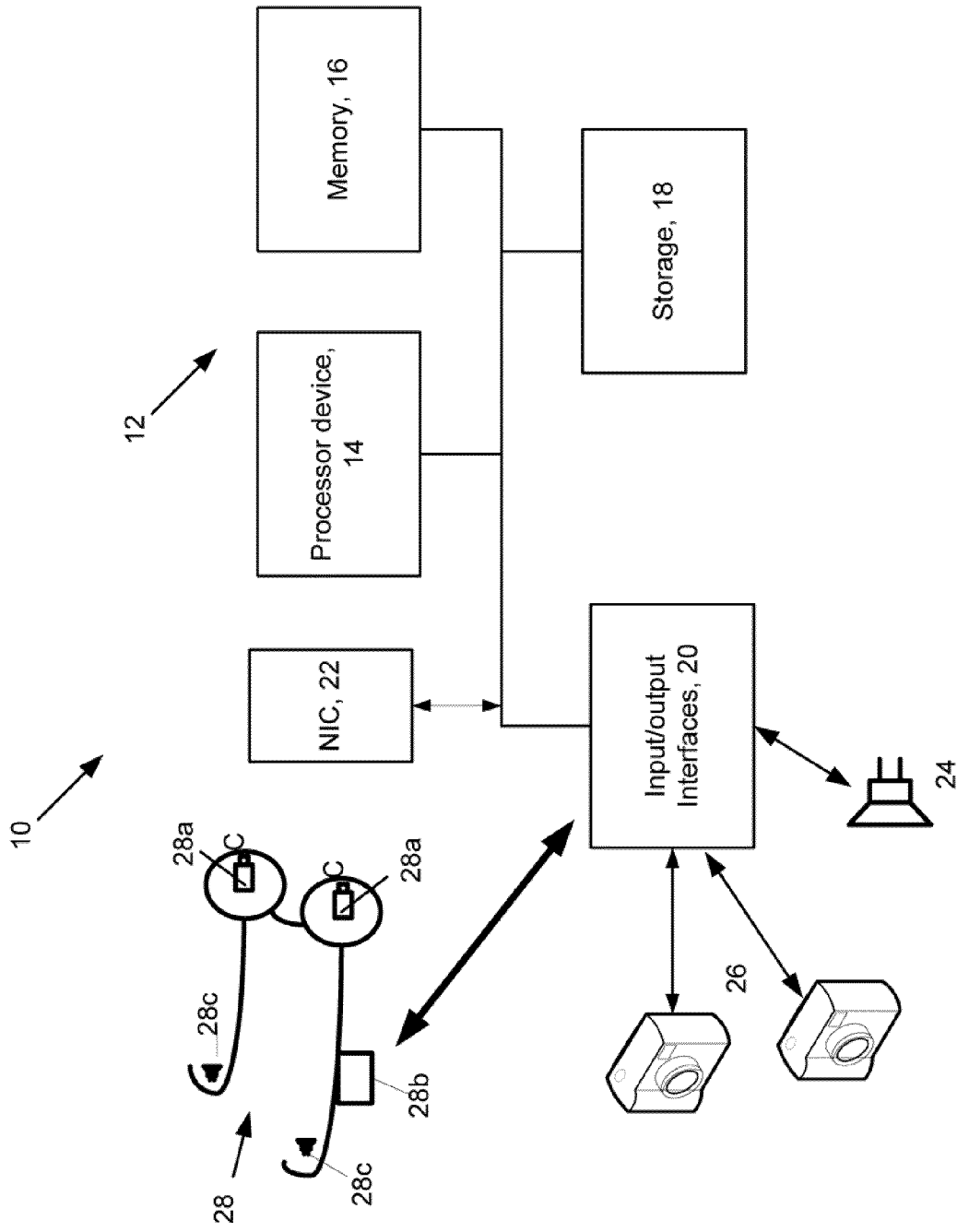
FIGS. 1-3 are block diagrams depicting various configurations for a portable reading machine.

Referring to FIG. 1 a configuration of a portable reading machine 10 is shown. The portable reading machine 10 includes a portable computing device 12 and image input device 26, e.g. here two cameras, as shown. Alternatively, the portable reading machine 10 can be a camera with enhanced computing capability and/or that operates at multiple image resolutions. The image input device, e.g. still camera, video camera, portable scanner, collects image data to be transmitted to the processing device. The portable reading machine 10 has the image input device coupled to the computing device 12 using a cable (e.g. USB, Firewire) or using wireless technology (e.g. Wi-Fi, Bluetooth, wireless USB) and so forth. An example is consumer digital camera coupled to a pocket PC or a handheld Windows or Linux PC, a personal digital assistant and so forth. The portable reading machine 10 will include various computer programs to provide reading functionality as discussed below.

In general as in FIG. 1, the computing device 12 of the portable reading machine 10 includes at least one processor device 14, memory 16 for executing computer programs and persistent storage 18, e.g., magnetic or optical disk, PROM, flash Prom or ROM and so forth that permanently stores computer programs and other data used by the reading machine 10. In addition, the portable reading machine 10 includes input and output interfaces 20 to interface the processing device to the outside world. The portable reading machine 10 can include a network interface card 22 to interface the reading machine to a network (including the Internet), e.g., to upload programs and/or data used in the reading machine 10.

The portable reading machine 10 includes an audio output device 24 to convey synthesized speech to the user from various ways of operating the reading machine. The camera and audio devices can be coupled to the computing device using a cable (e.g. USB, Firewire) or using wireless technology (e.g. Wi-Fi, Bluetooth) etc.

The portable reading machine 10 may have two cameras, or video input devices 26, one for high resolution and the other for lower resolution images. The lower resolution camera may be support lower resolution scanning for capturing gestures or directed reading, as discussed below. Alternatively, the portable reading machine may have one camera capable of a variety of resolutions and image capture rates that serves both functions. The portable reading machine can be used with a pair of "eyeglasses" 28. The eyeglasses 28 may be integrated with one or more cameras 28a and coupled to the portable reading machine, via a communications link. The eyeglasses 26 provide flexibility to the user. The communications link 28b between the eyeglasses and the portable reading machine can be wireless or via a cable, as discussed above. The Reading glasses 28 can have integrated speakers or earphones 28c to allow the user to hear the audio output of the portable reading machine.

For example, in the transaction mode described below, at an automatic teller machine (ATM) for example, an ATM screen and the motion of the user's finger in front of the ATM screen are detected by the reading machine 10 through processing data received by the camera 28a mounted in the glasses 28. In this way, the portable reading machine 10 "sees" the location of the user's finger much as sighted people would see their finger. This would enable the portable reading machine 10 to read the contents of the screen and to track the position of the user's finger, announcing the buttons and text that were under, near or adjacent the user's finger.

Figure 1A:
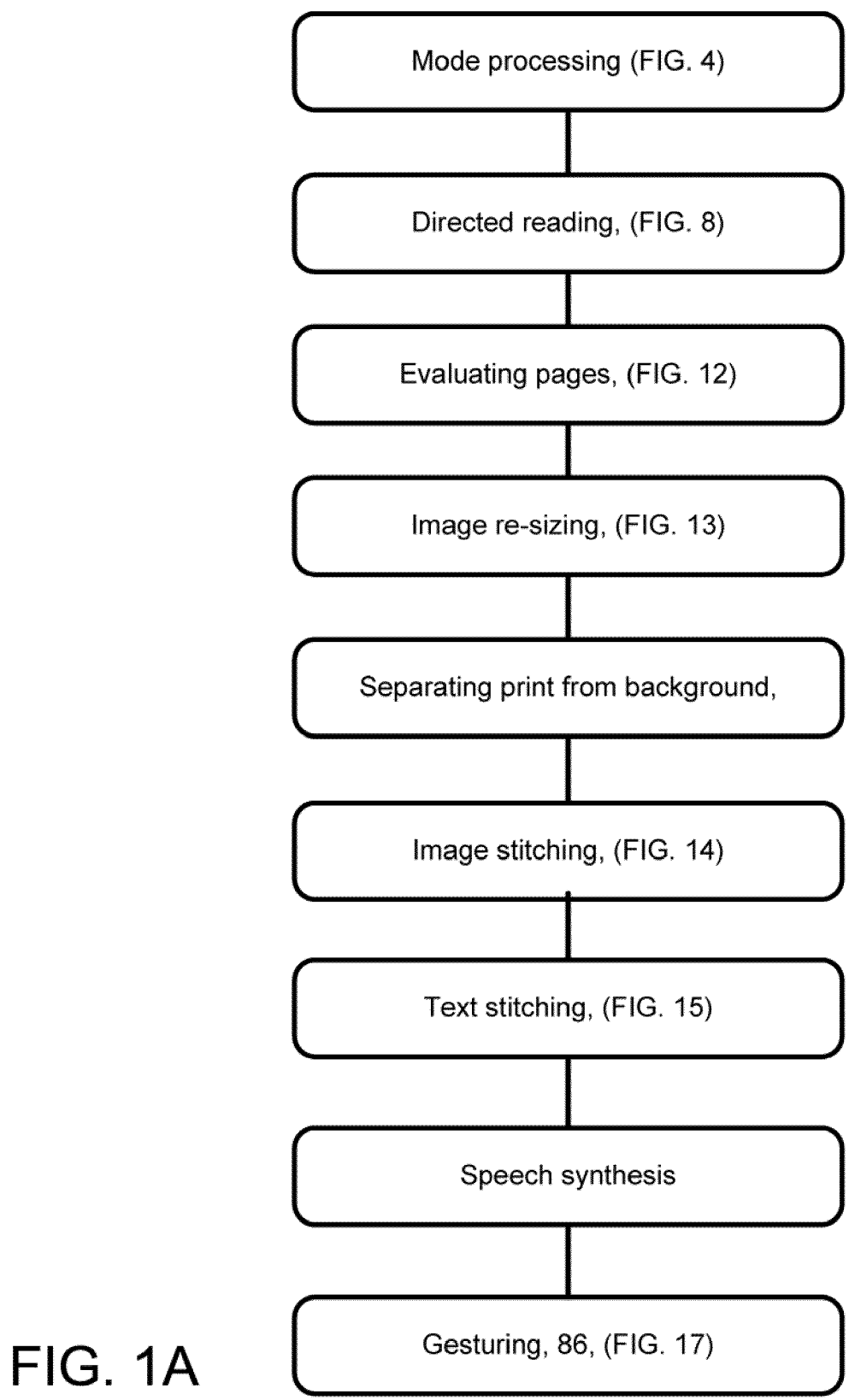
FIGS. 1A and 1B are diagrams depicting functions for the reading machine
Figure 1B:
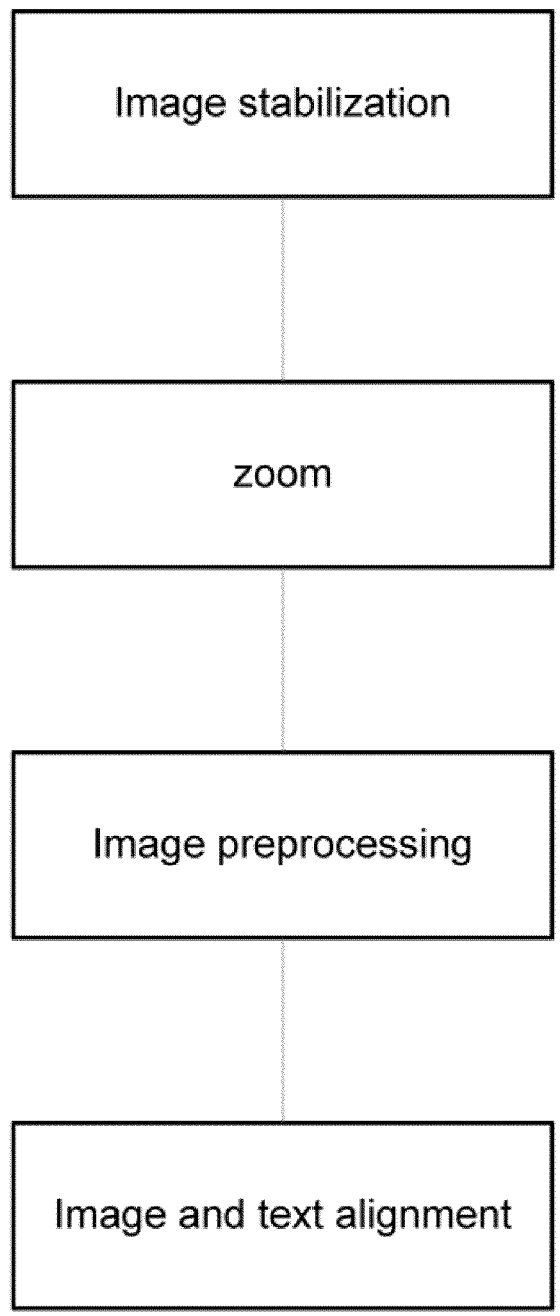
Figure 2:
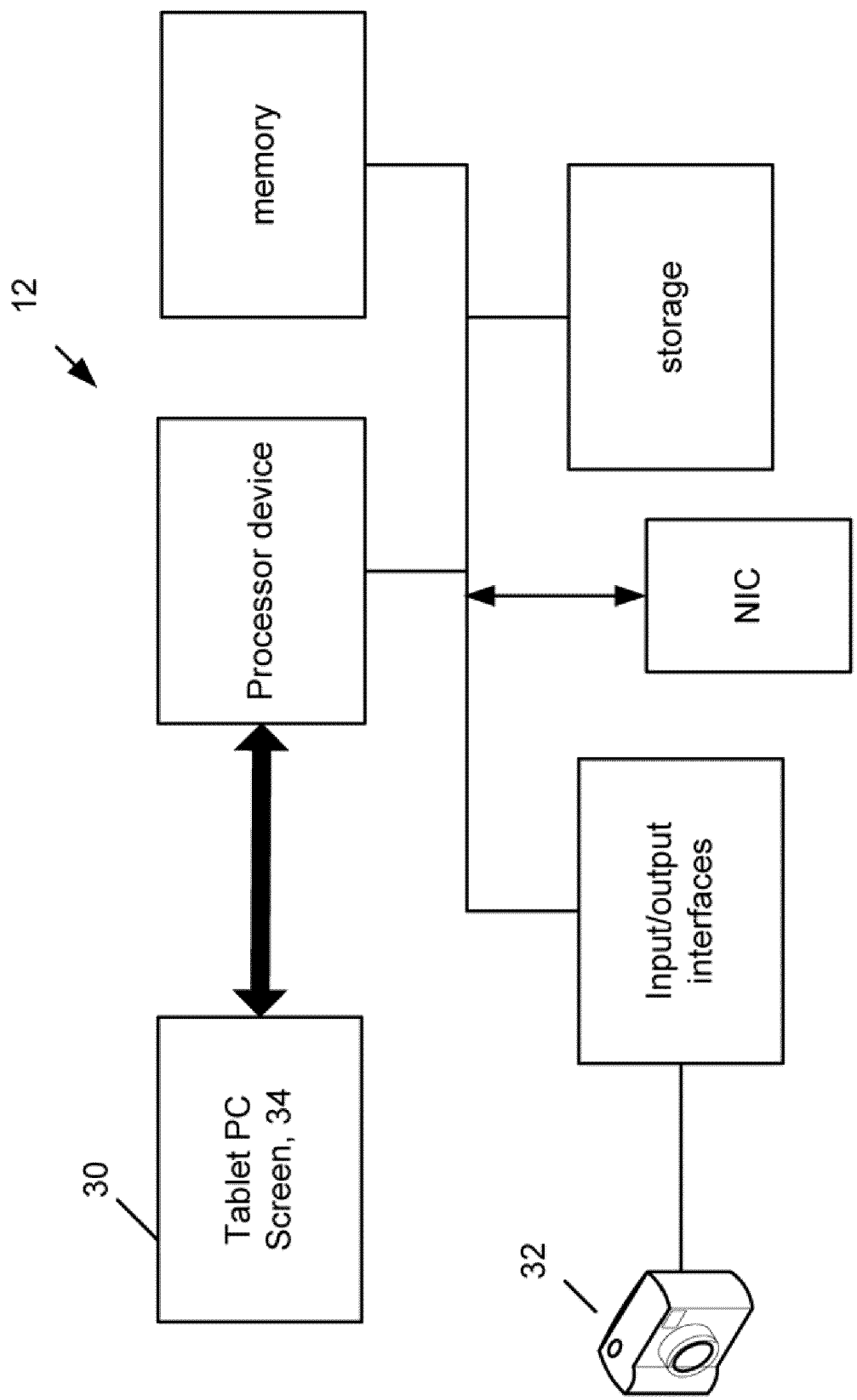
Figure 3:
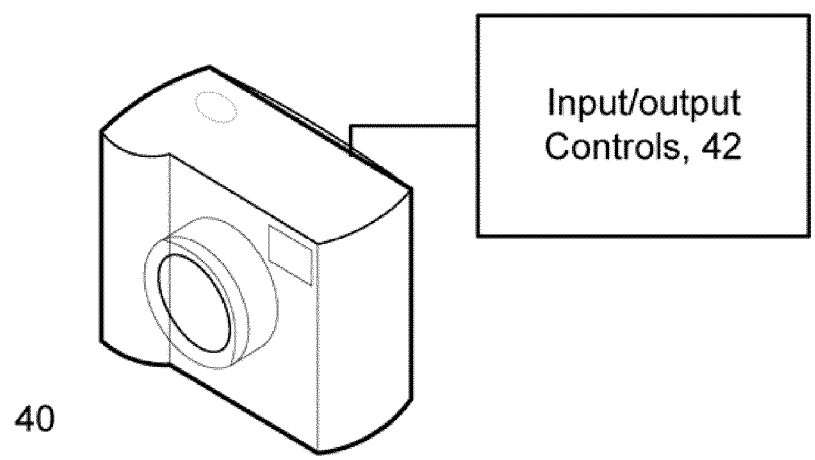
Figure 9:
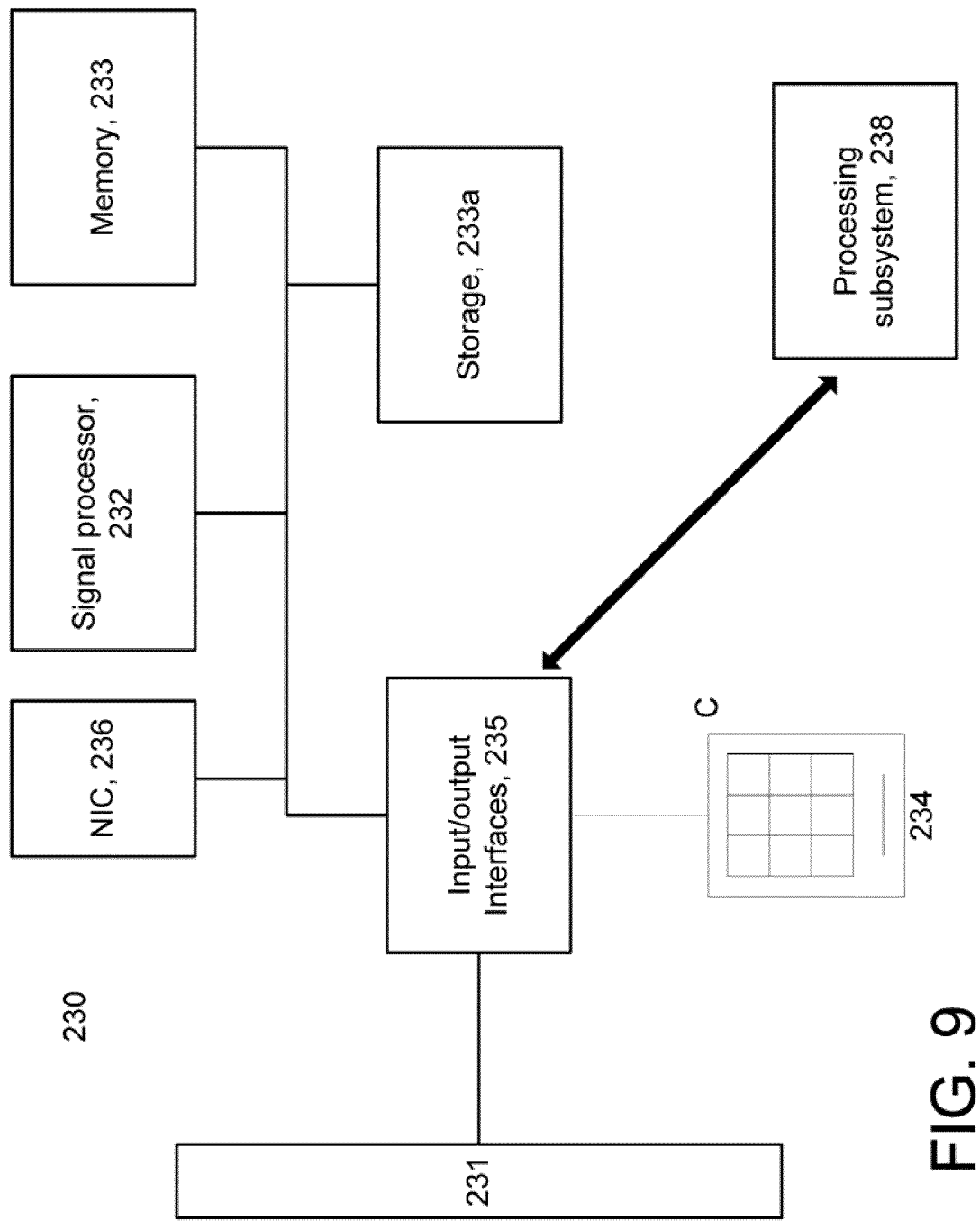
FIG. 9 is a block diagram depicting an alternative arrangement for a reading machine.

Referring to FIGS. 1A and 1B, processing functions that are performed by the reading machine of FIG. 1 or the embodiments shown in FIGS. 2, 3 and 9 includes reading machine functional processing (FIG. 1A) and image processing (FIG. 1B).

Figure 15:
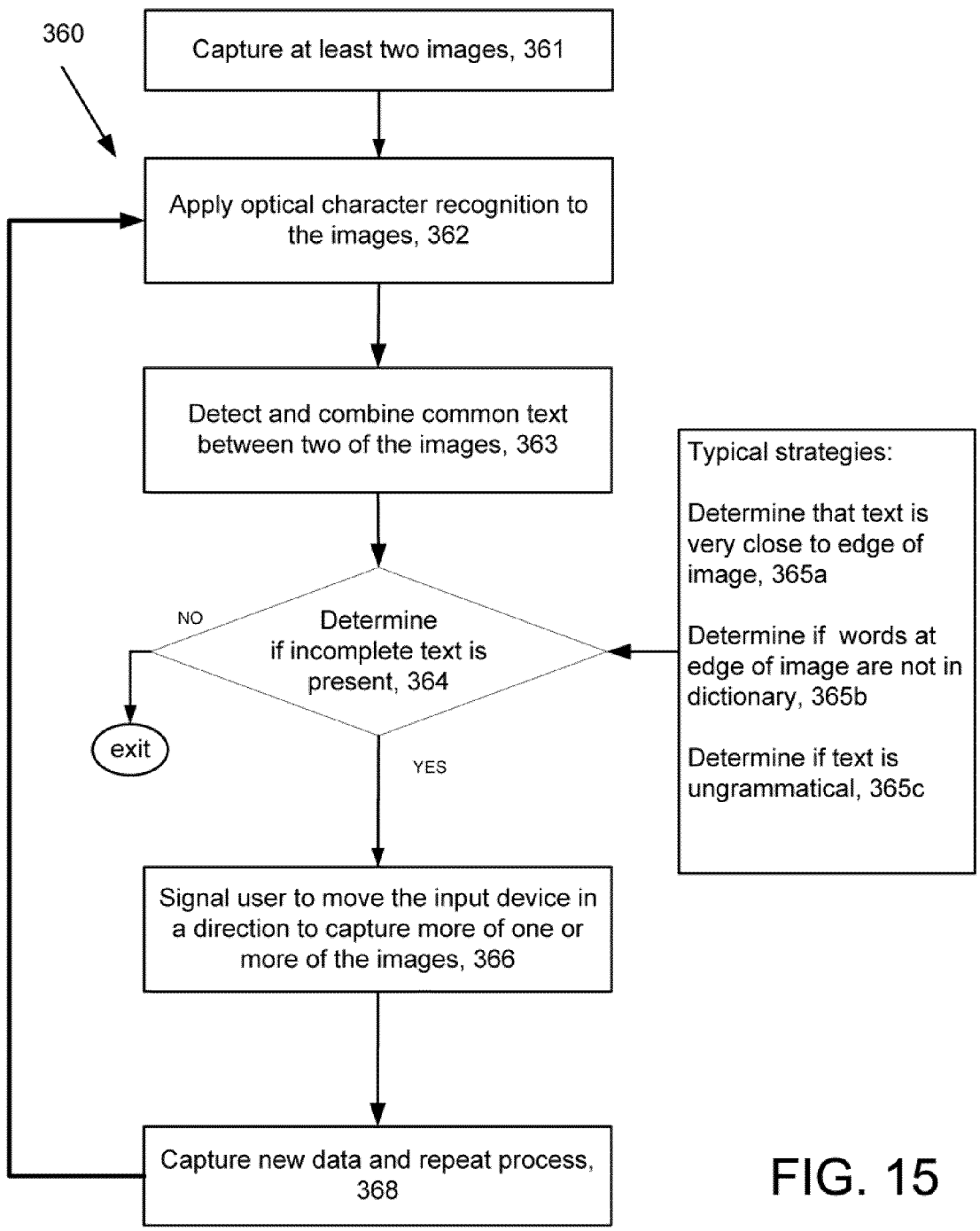
FIG. 15 is a flow chart depicting text stitching.
Figure 16:
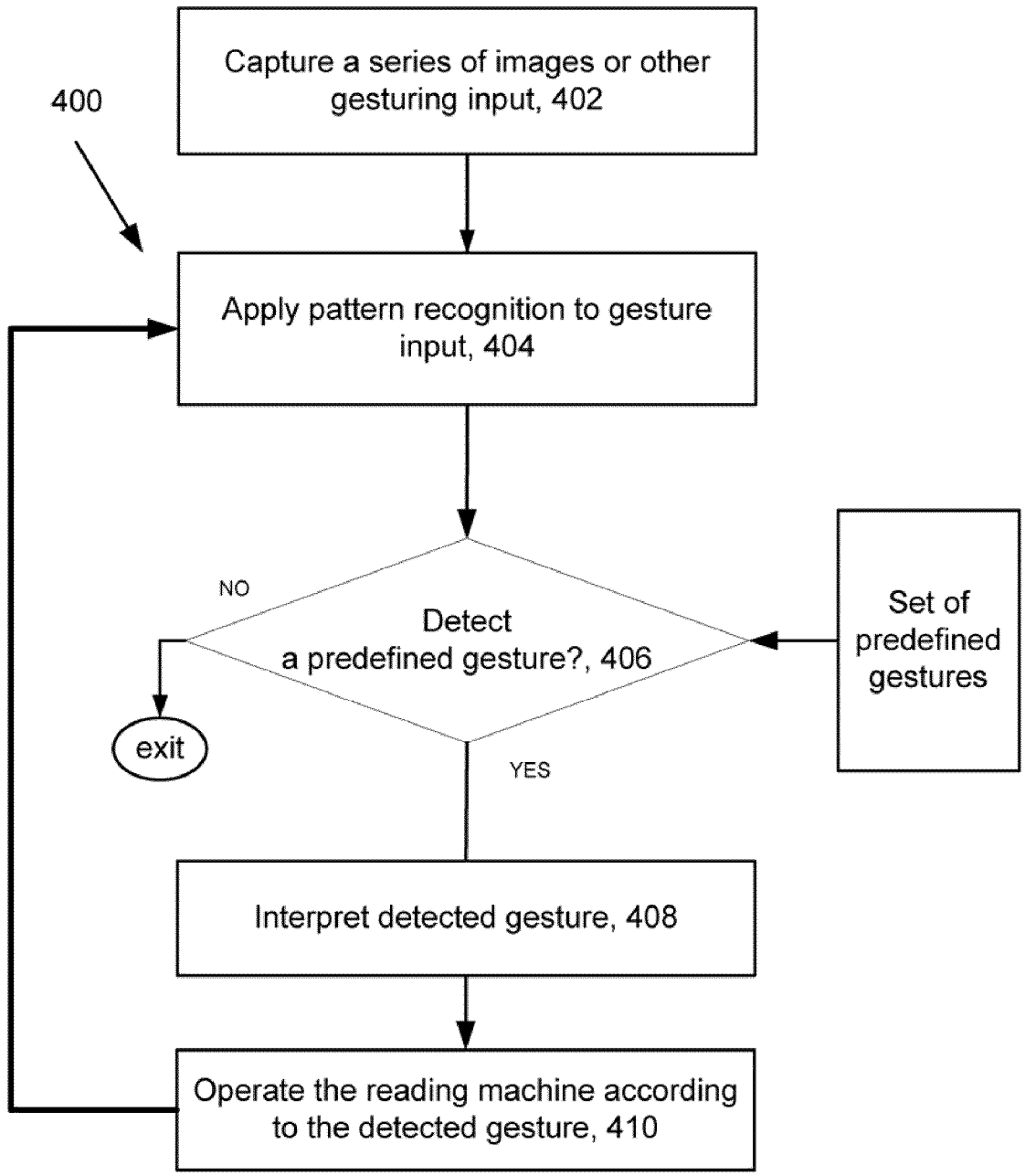
FIG. 16 is a flow chart depicting gesture processing.

FIG. 1A shows various functional modules for the reading machine 10 including mode processing (FIG. 4), a directed reading process (FIG. 8), a process to detect incomplete pages (FIG. 12), a process to provide image object re-sizing (FIG. 13), a process to separate print from background (discussed below), an image stitching process (FIG. 14), text stitching process (FIG. 15), conventional speech synthesis processing, and gesture processing (FIG. 16).

In addition, as shown in FIG. 1B, the reading machine 10 includes image stabilization, zoom, image preprocessing, and image and text alignment functions, as generally discussed below.

Referring to FIG. 2, a tablet PC 30 and remote camera 32 could be used with computing device 12 to provide another embodiment of the portable reading machine 10. The tablet PC would include a screen 34 that allows a user to write directly on the screen. Commercially available tablet PC's could be used. The screen 34 is used as an input device for gesturing with a stylus. The image captured by the camera 34 may be mapped to the screen 30 and the user would move to different parts of the image by gesturing. The computing device 12 (FIG. 1) could be used to process images from the camera based on processes described below. In the document mode described below, the page is mapped to the screen and the user moves to different parts of the document by gesturing.

Referring to FIG. 3, the portable reading machine 10 can be implemented as a handheld camera 40 with input and output controls 42. The handheld camera 40 may have some controls that make it easier to use the overall system. The controls may include buttons, wheels, joysticks, touch pads, etc. The device may include speech recognition software, to allow voice input driven controls. Some controls may send the signal to the computer and cause it to control the camera or to control the reader software. Some controls may send signals to the camera directly. The handheld portable reading machine 10 may also have output devices such as a speaker or a tactile feedback output device.

Benefits of an integrated camera and device control include that the integrated portable reading machine can be operated with just one hand and the portable reading machine is less obtrusive and can be more easily transported and manipulated.

Cooperative Processing

Figure 3A:
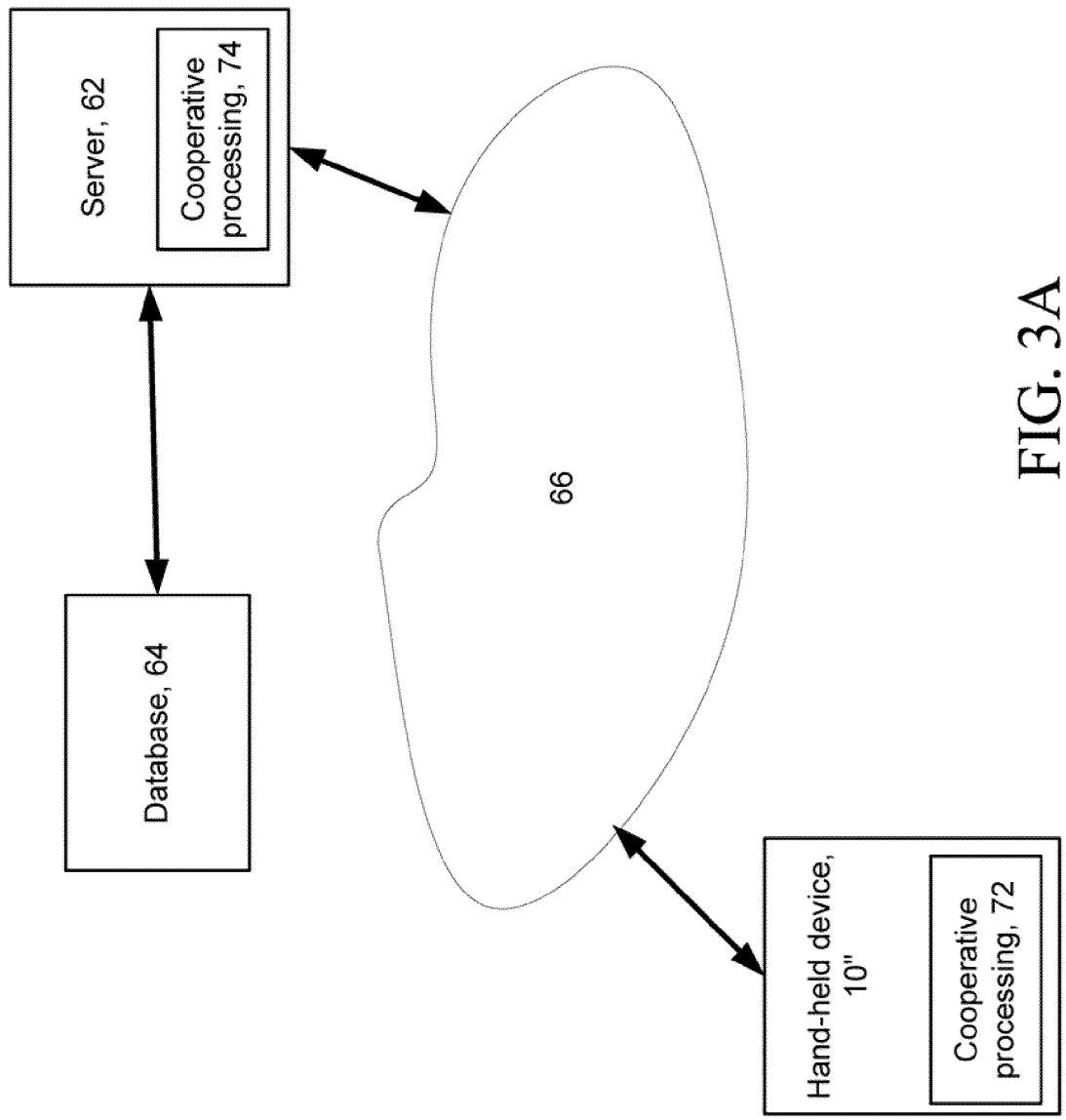
FIG. 3A is a block diagram depicting a cooperative processing arrangement.

Referring to FIG. 3A, an alternative arrangement 60 for processing data for the portable reading device 10 is shown. The portable reading device is implemented as a handheld device 10" that works cooperatively with a computing system 62. In general, the computing system 62 has more computing power and more database storage 64 than the hand-held device 10'. The computing system 62 and the hand held device 10' would include software 72, 74, respectively, for cooperative processing 70. The cooperative processing 70 can enable the handheld device that does not have sufficient resources for effective OCR and TTS to be used as a portable reading device by distributing the processing load between the handheld device 10 and computing system 62. Typically, the handheld device communicates with the computing system over a dedicated wireless connection 66 or through a network, as shown.

An example of a handheld device is a mobile phone with a built-in camera. The phone is loaded with the software 72 to communicate with the computing system 62. The phone can also include software to implement some of the modes discussed below such as to allow the user to direct the reading and navigation of resulting text, conduct a transaction and so forth. The phone acquires images that are forwarded and processed by the computing system 62, as will now be described.

Figure 3B:
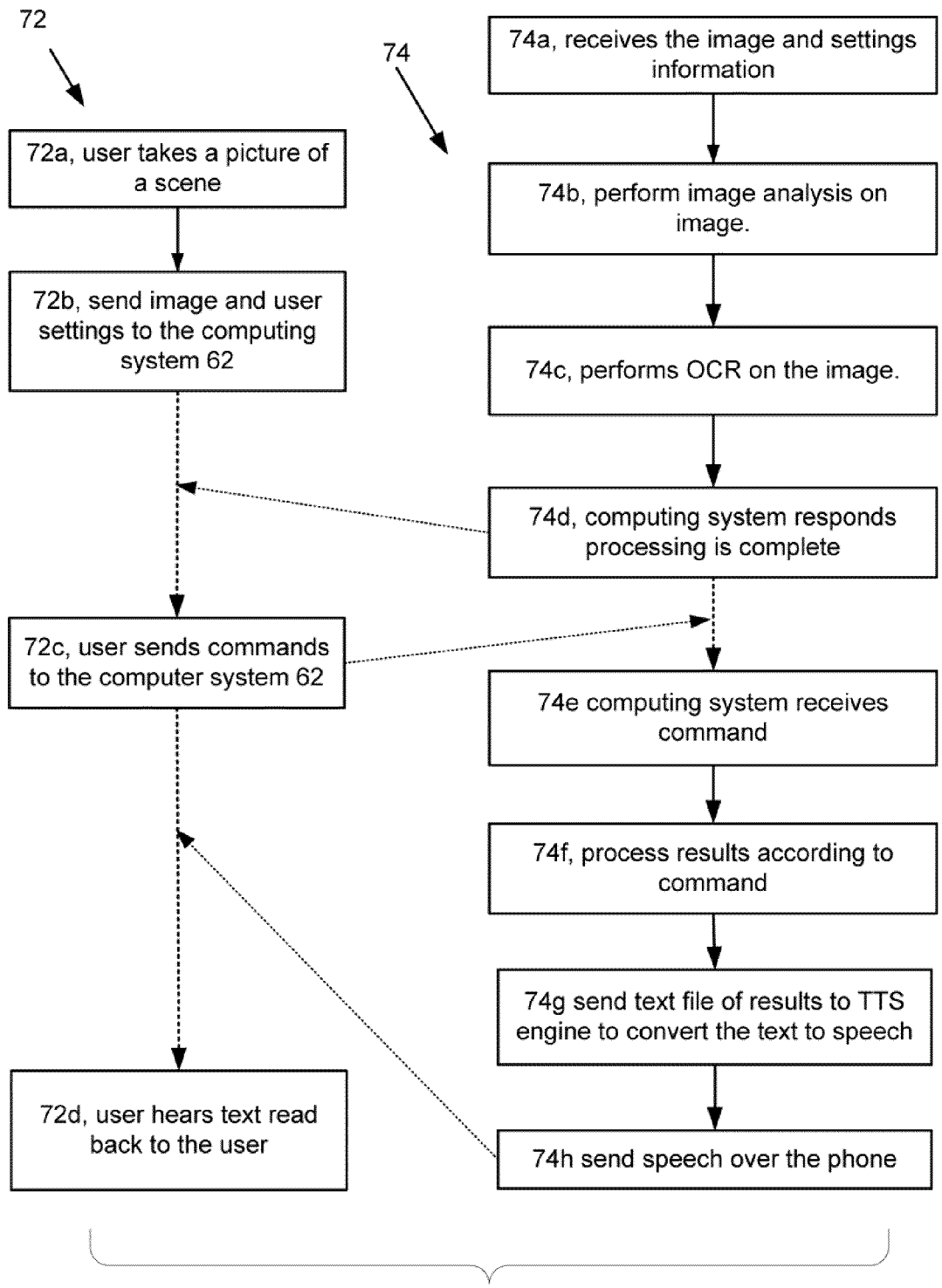
FIG. 3B is a flow chart depicting a typical processing flow for cooperative processing.

Referring to FIG. 3B, the user of the reading machine 10, as a phone, takes 72a a picture of a scene, e.g., document, outdoor environment, device, etc., and sends 72b the image and user settings to the computing system 62, using a wireless mobile phone connection 66. The computing system 62 receives 74a the image and settings information and performs 74b image analysis and OCR 74c on the image. The computing system can respond 74d that the processing is complete.

The user can read any recognized text on the image by using the mobile keypad to send commands 72c to the computer system 62 to navigate the results. The computing system 62 receives the command, processes the results according to the command, and sends 74f a text file of the results to a text to speech (TTS) engine to convert the text to speech and sends 74g the speech over the phone as would occur in a phone call. The user can then hear 72d the text read back to the user over the phone. Other arrangements are possible. For example, the computing system 62 could to supply a description of result of the OCR processing besides the text that was found, could forward a text file to the device 10' and so forth.

The computing system 62 uses the TTS engine to generate the speech to read the text or announce meta-information about the result, such as the document type or layout, the word count, number of sections etc. The manner in which a person uses the phone and to direct the processing system to read, announce and navigate the text shares some similarity with the way a person may use a mobile phone to review, listen to and manage voicemail.

The software for acquiring the images may additionally implement the less resource-intensive features of a standalone reading device. For example, the software may implement the processing of low resolution (e.g. 320×240) video preview images to determine the orientation of the camera relative to the text, or to determine whether the edges of a page are cut off from the field of view of the camera. Doing the pre-processing on the handheld device makes the preview process seem more responsive to the user. In order to reduce the transmission time for the image, the software may reduce the image to a black and white bitmap, and compress it using standard, e.g., fax compression techniques.

For handheld devices with TTS capability the processing system can return the OCR'd text and meta-information back to the phone and allow the text to be navigated and read on the handheld device. In this scenario, the handheld device also includes software to implement the reading and text navigation.

The computing system 62 is likely to have one to two orders of magnitude greater processing power than a typical handheld device. Furthermore, the computing system can have a much larger knowledge bases 64 for more detailed and robust analysis. The knowledge bases 64 and software for the server 62 can be automatically updated and maintained by a third party to provide the latest processing capability.

Examples of the computing systems 62 include a desktop PC, a shared server available on a local or wide area network, a server on a phone-accessible network, or even a wearable computer.

A PDA with built-in or attached camera can be used for cooperative processing. The PDA can be connected to a PC using a standard wireless network. A person may use the PDA for cooperative processing with a computer at home or in the office, or with a computer in a facility like a public library. Even if the PDA has sufficient computing power to do the image analysis and OCR, it may be much faster to have the computing system do the processing.

Cooperative processing can also include data sharing. The computing system can serve as the repository for the documents acquired by the user. The reading machine device 10 can provide the functionality to navigate through the document tree and access a previously acquired document for reading. For handheld devices that have TTS and can support standalone reading, documents can be loaded from the repository and "read" later. For handheld devices that can act as standalone reading devices, the documents acquired and processed by on the handheld device can be stored in the computing system repository.

Mode Processing

Figure 4:
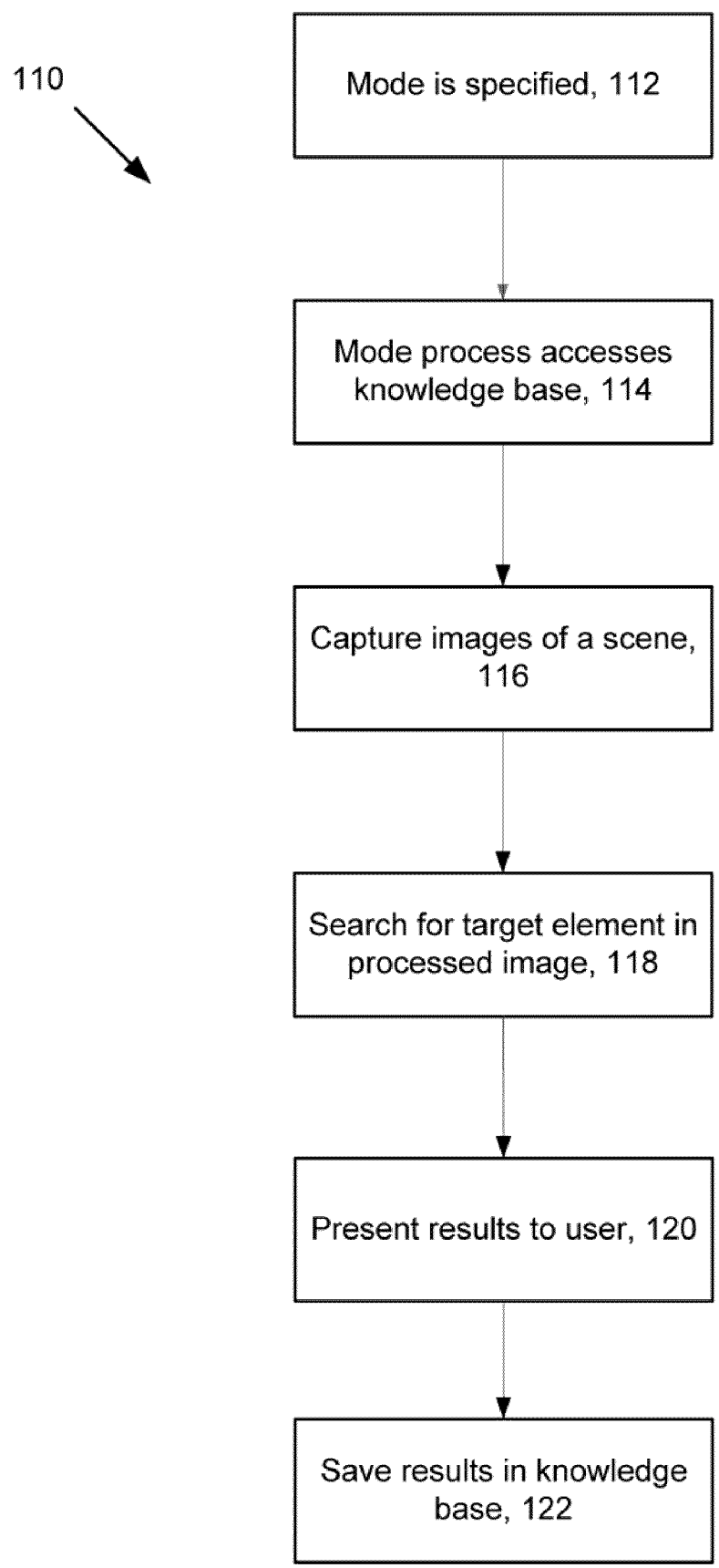
FIG. 4 is flow chart depicting mode processing.

Referring to FIG. 4, a process 110 for operating the reading machine using modes is shown. Various modes can be incorporated in the reading machine, as discussed below. Parameters that define modes are customized for a specific type of environment. In one example, the user specifies 112 the mode to use for processing an image. For example, the user may know that he or she is reading a menu, wall sign, or a product container and will specify a mode that is configured for the type of item that the user is reading. Alternatively, the mode is automatically specified by processing of images captured by the portable reading machine 10. Also, the user may switch modes transiently for a few images, or select a setting that will persist until the mode is changed.

The reading machine accesses 114 data based on the specified mode from a knowledge base that can reside on the reading machine 10 or can be downloaded to the machine 10 upon user request or downloaded automatically. In general, the modes are configurable, so that the portable reading machine preferentially looks for specific types of visual elements.

The reading machine captures 116 one or several images of a scene and processes the image to identify 118 one or more target elements in the scene using information obtained from the knowledge base. An example of a target element is a number on a door or an exit sign. Upon completion of processing of the image, the reading machine presents 120 results to a user. Results can include various items, but generally is a speech or other output to convey information to the user. In some embodiments of mode processing 110, the reading machine processes the image(s) using more than one mode and presents the result to a user based on an assessment of which mode provided valid results.

The modes can incorporate a "learning" feature so that the user can save 122 information from processing a scene so that the same context is processed easier the next time. New modes may be derived as variations of existing modes. New modes can be downloaded or even shared by users.

Document Mode

Figure 5:
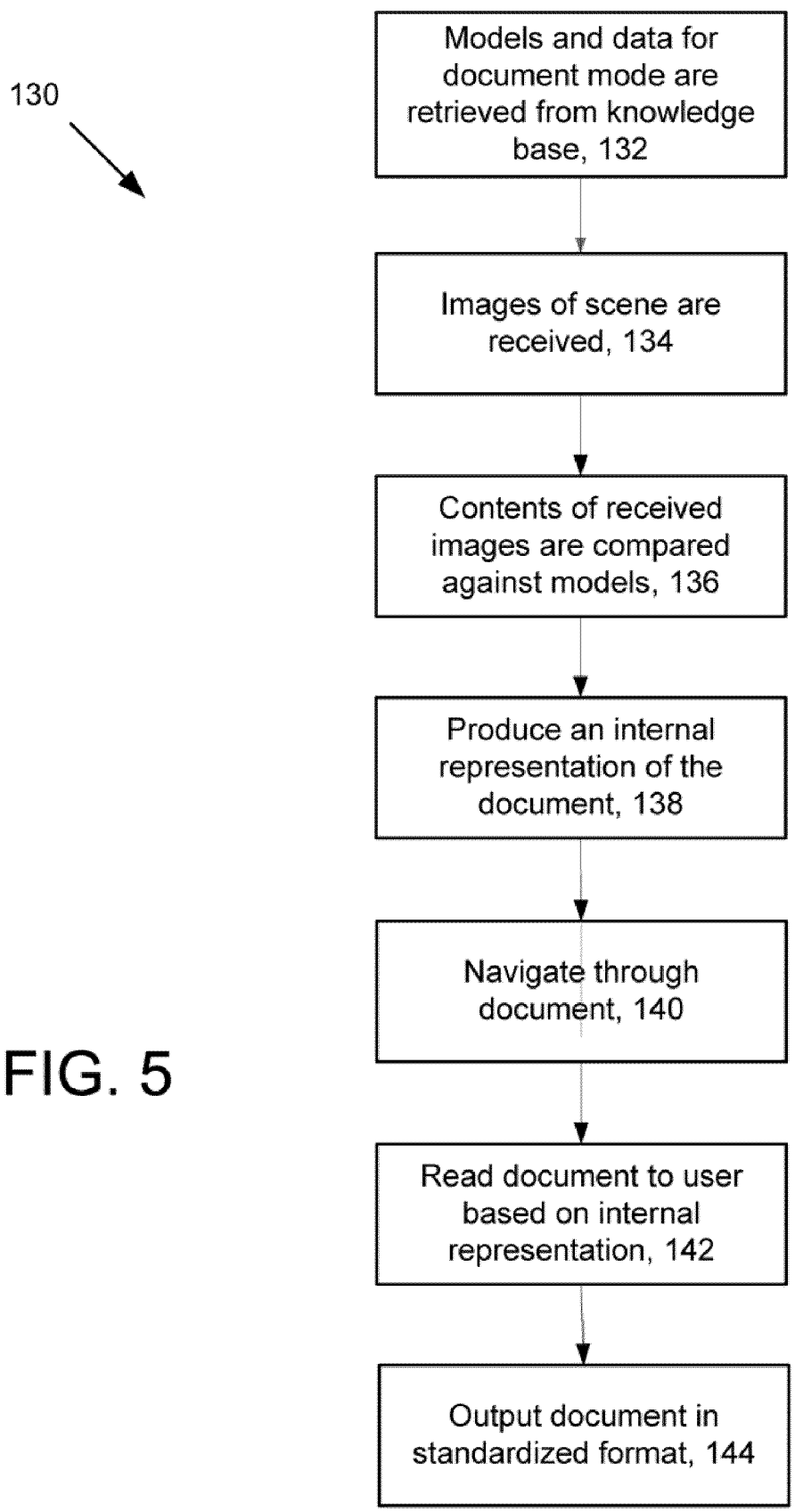
FIG. 5 is a flow chart depicting document processing.

Referring to FIG. 5, a document mode 130 is provided to read books, magazines and paper copy. The document mode 130 supports various layout variations found in memos, journals and books. Data regarding the document mode is retrieved 132 from the knowledge base. The document mode 130 accommodates different types of formats for documents. In document mode 130, the contents of received 134 image(s) are compared 136 against different document models retrieved from the knowledge base to determine which model(s) match best to the contents of the image. The document mode supports multi-page documents in which the portable reading machine combines 138 information from multiple pages into one composite internal representation of the document that is used in the reading machine to convey information to the user. In doing this, the portable reading machine processes pages, looking for page numbers, section headings, figures captions and any other elements typically found in the particular document. For example, when reading a US Patent, the portable reading machine may identify the standard sections of the patent, including the title, inventors, abstract, claims, etc.

The document mode allows a user to navigate 140 the document contents, stepping forward or backward by a paragraph or section, or skipping to a specific section of the document or to a key phrase.

Using the composite internal representation of the document, the portable reading machine reads 142 the document to a user using text-to-speech synthesis software. Using such an internal representation allows the reading machine to read the document more like a sighted person would read such a document. The document mode can output 144 the composite document in a standardized electronic machine-readable form using a wireless or cable connection to another electronic device. For example, the text recognized by OCR can be encoded using XML markup to identify the elements of the document. The XML encoding may capture not only the text content, but also the formatting information. The formatting information can be used to identify different sections of the document, for instance, table of contents, preface, index, etc. that can be communicated to the user. Organizing the document into different sections can allow the user to read different parts of the document in different order, e.g., a web page, form, bill etc.

When encoding a complex form such as a utility bill, the encoding can store the different sections, such as addressee information, a summary of charges, and the total amount due sections. When semantic information is captured in this way, it allows the blind user to navigate to the information of interest. The encoding can capture the text formatting information, so that the document can be stored for use by sighted people, or for example, to be edited by a visually impaired person and sent on to a sighted individual with the original formatting intact.

Clothing Mode

Figure 6:
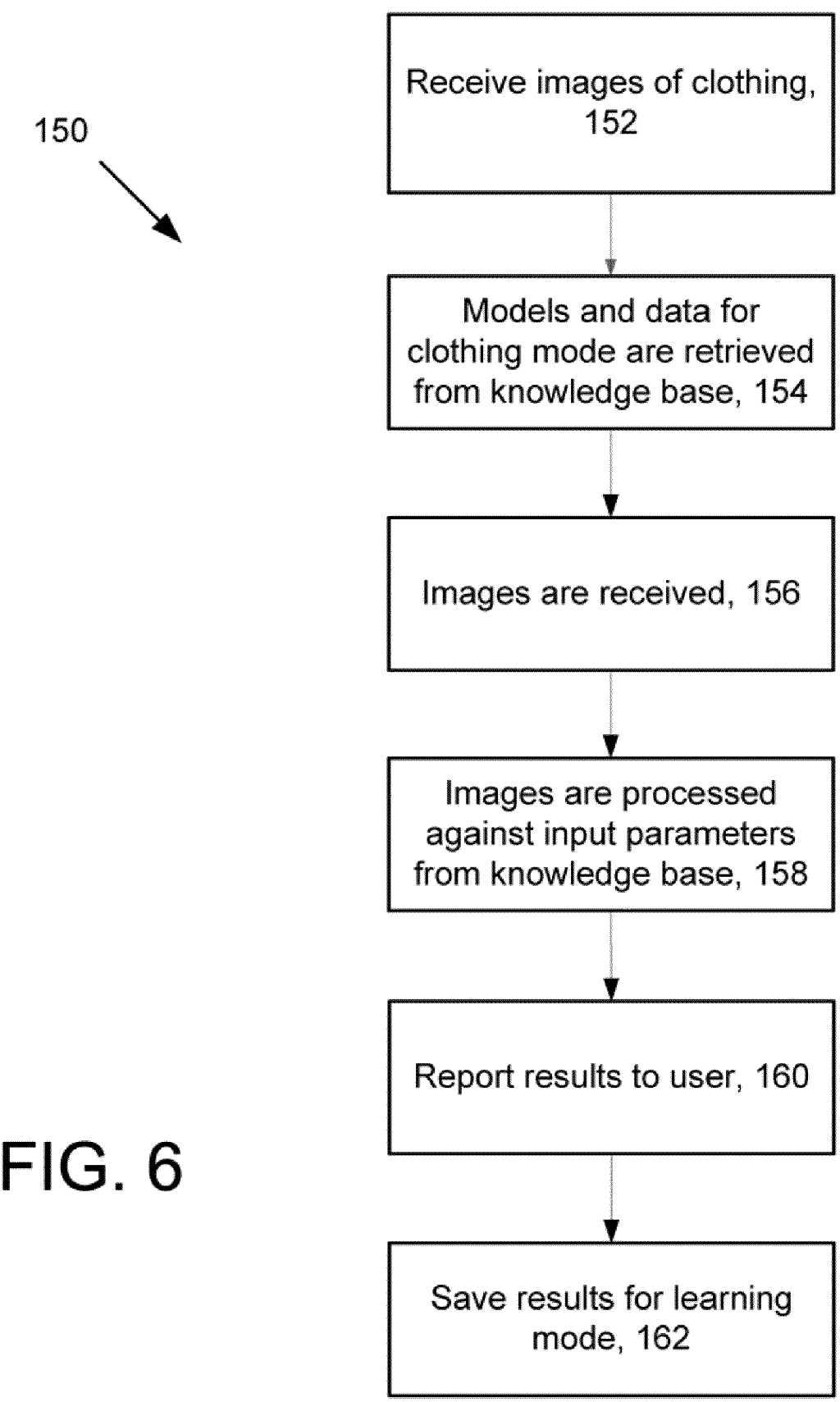
FIG. 6 is a flow chart depicting a clothing mode.

Referring to FIG. 6, a clothing mode 150 is shown. The "clothing" mode helps the user, e.g., to get dressed by matching clothing based on color and pattern. Clothing mode is helpful for those who are visually impaired, including those who are colorblind but otherwise have normal vision. The reading machine receives 152 one or more images of an article of clothing. The reading machine also receives or retrieves 154 input parameters from the knowledge base. The input parameters that are retrieved include parameters that are specific to the clothing mode. Clothing mode parameters may include a description of the pattern (solid color, stripes, dots, checks, etc.). Each clothing pattern has a number of elements, some of which may be empty for particular patterns. Examples of elements include background color or stripes. Each element may include several parameters besides color, such as width (for stripes), or orientation (e.g. vertical stripes). For example, slacks may be described by the device as "gray vertical stripes on a black background", or a jacket as "Kelly green, deep red and light blue plaid".

The portable reading machine receives 156 input data corresponding to the scanned clothing and identifies 158 various attributes of the clothing by processing the input data corresponding to the captured images in accordance with parameters received from the knowledge base. The portable reading machine reports 160 the various attributes of the identified clothing item such as the color(s) of the scanned garment, patterns, etc. The clothing attributes have associated descriptions that are sent to speech synthesis software to announce the report to the user. The portable reading machine recognizes the presence of patterns such as stripes or check by comparisons to stored patterns or using other pattern recognition techniques. The clothing mode may "learn" 162 the wardrobe elements (e.g. shirts, pants, socks) that have characteristic patterns, allowing a user to associate specific names or descriptions with individual articles of clothing, making identification of such items easier in future uses.

In addition to reporting the colors of the current article to the user, the machine may have a mode that matches a given article of clothing to another article of clothing (or rejects the match as incongruous). This automatic clothing matching mode makes use of two references: one is a database of the current clothes in the user's possession, containing a description of the clothes' colors and patterns as described above. The other reference is a knowledge base containing information on how to match clothes: what colors and patterns go together and so forth. The machine may find the best match for the current article of clothing with other articles in the user's collection and make a recommendation. Reporting 160 to the user can be as a tactile or auditory reply. For instance, the reading machine after processing an article of clothing can indicate that the article was "a red and white striped tie."

Transaction Mode

Figure 7:
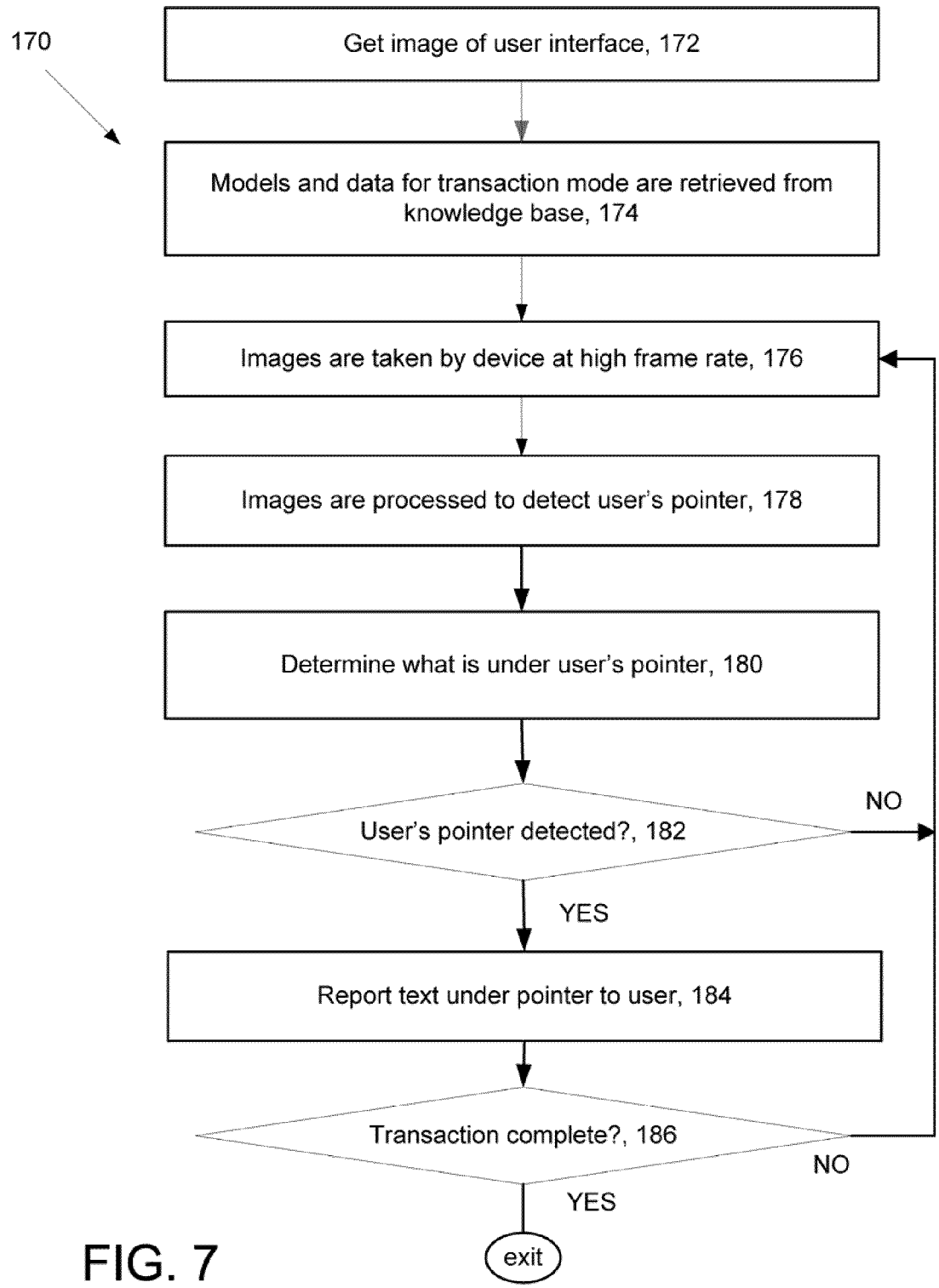
FIG. 7 is a flow chart depicting a transaction mode.

Referring to FIG. 7, a transaction mode 170 is shown. The transaction mode 170 applies to transaction-oriented devices that have a layout of controls, e.g. buttons, such as automatic teller machines (ATM), e-ticket devices, electronic voting machines, credit/debit devices at the supermarket, and so forth. The portable reading machine 10 can examines a layout of controls, e.g., buttons, and recognize the buttons in the layout of the transaction-oriented device. The portable reading machine 10 can tell the user how to operate the device based on the layout of recognized controls or buttons. In addition, many of these devices have standardized layouts of buttons for which the portable reading machine 10 can have stored templates to more easily recognize the layouts and navigate the user through use of the transaction-oriented device. RFID tags can be included on these transaction-oriented devices to inform a reading machine 10, equipped with an RFID tag reader, of the specific description of the layout, which can be used to recall a template for use by the reading machine 10.

The transaction mode 170 uses directed reading (discussed below). The user captures an image of the transaction machine's user interface with the reading machine, that is, causes the reading machine to receive an image 172 of the controls that can be in the form of a keypad, buttons, labels and/or display and so forth. The buttons may be true physical buttons on a keypad or buttons rendered on a touch screen display. The reading machine retrieves 174 data pertaining to the transaction mode. The data is retrieved from a knowledge base. For instance, data can be retrieved from a database on the reading machine, from the transaction device or via another device.

Data retrieval to make the transaction mode more robust and accurate can involve a layout of the device, e.g., an automatic teller machine (ATM), which is pre-programmed or learned as a customized mode by the reading machine. This involves a sighted individual taking a picture of the device and correctly identifying all sections and buttons, or a manufacturer providing a customized database so that the user can download the layout of the device to the reading machine 10.

The knowledge base can include a range of relevant information. The mode knowledge base includes general information, such as the expected fonts, vocabulary or language most commonly encountered for that device. The knowledge base can also include very specific information, such as templates that specify the layout or contents of specific screens. For ATMs that use the touch-screen to show the labels for adjacent physical buttons, the mode knowledge base can specify the location and relationship of touch-screen labels and the buttons. The mode knowledge base can define the standard shape of the touch-screen pushbuttons, or can specify the actual pushbuttons that are expected on any specified screen.

The knowledge base may also include information that allows more intelligent and natural sounding summaries of the screen contents. For example, an account balances screen model can specify that a simple summary including only the account name and balance be listed, skipping other text that might appear on the screen.

The user places his/her finger over the transaction device. Usually a finger is used to access an ATM, but the reading machine can detect many kinds of pointers, such as a stylus which may be used with a touchscreen, a pen, or any other similar pointing device. The video input device starts 176 taking images at a high frame rate with low resolution. Low resolution images may be used during this stage of pointer detection, since no text is being detected. Using low resolution images will speed processing, because the low resolution images require fewer bits than high resolution images and thus there are fewer bits to process. The reading machine processes those low resolution images to detect 178 the location of the user's pointer. The reading machine determines 180 what is in the image underlying, adjacent, etc. the pointer. The reading machine may process the images to detect the presence of button arrays along an edge of the screen as commonly occurs in devices such as ATMs. The reading machine continually processes captured images.

If an image (or a series of images) containing the user's pointer is not processed 182, the reading machine processes 178 more images or can eventually (not shown) exit. Alternatively, the reading machine 10 signals the user that the fingertip was not captured (not shown). This allows the user to reposition the fingertip or allows the user to signal that the transaction was completed by the user.

If the user's pointer was detected and the reading machine has determined the text under it, the information is reported 184 to the user.

If the reading machine receives 186 a signal from the user that the transaction was completed, then the reading machine 10 can exit the mode. A timeout can exist for when the reading machine fails to detect the user's fingertip, it can exit the mode.

A transaction reading assistant mode can be implemented on a transaction device. For example, an ATM or other type of transaction oriented device may have a dedicated reading machine, e.g., reading assistant, adapted to the transaction device. The reading assistant implements the ATM mode described above. In addition to helping guide the user in pressing the buttons, the device can read the information on the screen of the transaction device. A dedicated reading assistant would have a properly customized mode that improves its performance and usability.

A dedicated reading machine that implements directed reading uses technologies other than a camera to detect the location of the pointer. For example, it may use simple detectors based on interrupting light such as infrared beams, or capacitive coupling.

Other Modes

The portable reading machine can include a "restaurant" mode in which the portable reading machine preferentially identifies text and parses the text, making assumptions about vocabulary and phrases likely to be found on a menu. The portable reading machine may give the user hierarchical access to named sections of the menu, e.g., appetizers, salads, soups, dinners, dessert etc.

The portable reading machine may use special contrast enhancing processing to compensate for low lighting. The portable reading machine may expect fonts that are more varied or artistic. The portable reading machine may have a learning mode to learn some of the letters of the specific font and extrapolate.

The portable reading machine can include an "Outdoor Navigation Mode." The outdoor mode is intended the help the user with physical navigation. The portable reading machine may look for street signs and building signs. It may look for traffic lights and their status. It may give indications of streets, buildings or other landmarks. The portable reading machine may use GPS or compass and maps to help the user get around. The portable reading machine may take images at a faster rate and lower resolution process those images faster (do to low resolution), at relatively more current positions (do to high frame rate) to provide more "real-time" information such as looking for larger physical objects, such as buildings, trees, people, cars, etc.

The portable reading machine can include an "Indoor Navigation Mode." The indoor navigation mode helps a person navigate indoors, e.g., in an office environment. The portable reading machine may look for doorways, halls, elevators, bathroom signs, etc. The portable reading machine may identify the location of people.

Other modes include a Work area/Desk Mode in which a camera is mounted so that it can "see" a sizable area, such as a desk (or countertop). The reading portable reading machine recognizes features such as books or pieces of paper. The portable reading machine 10 is capable of being directed to a document or book. For example, the user may call attention by tapping on the object, or placing a hand or object at its edge and issuing a command. The portable reading machine may be "taught" the boundaries of the desktop. The portable reading machine may be controlled through speech commands given by the user and processed by the reading machine 10. The camera may have a servo control and zoom capabilities to facilitate viewing of a wider viewing area.

Another mode is a Newspaper mode. The newspaper mode may detect the columns, titles and page numbers on which the articles are continued. A newspaper mode may summarize a page by reading the titles of the articles. The user may direct the portable reading machine to read an article by speaking its title or specifying its number.

As mentioned above, radio frequency identification (RFID) tags can be used as part of mode processing. An RFID tag is a small device attached as a "marker" to a stationary or mobile object. The tag is capable of sending a radio frequency signal that conveys information when probed by a signal from another device. An RFID tag can be passive or active. Passive RFID tags operate without a separate external power source and obtain operating power generated from the reader device. They are typically pre-programmed with a unique set of data (usually 32 to 128 bits) that cannot be modified. Active RFID tags have a power source and can handle much larger amounts of information. The portable reader may be able to respond to RFID tags and use the information to select a mode or modify the operation of a mode.

The RFID tag may inform the portable reader about context of the item that the tag is attached to. For example, an RFID tag on an ATM may inform the portable reader 10 about the specific bank branch or location, brand or model of the ATM. The code provided by the RFID may inform the reader 10 about the button configuration, screen layout or any other aspect of the ATM. In an Internet-enabled reader, RFID tags are used by the reader to access and download a mode knowledge base appropriate for the ATM. An active RFID or a wireless connection may allow the portable reader to "download" the mode knowledge base directly from the ATM.

The portable reading machine 10 may have an RFID tag that is detected by the ATM, allowing the ATM to modify its processing to improve the usability of the ATM with the portable reader.

Directed Reading

Figure 8:
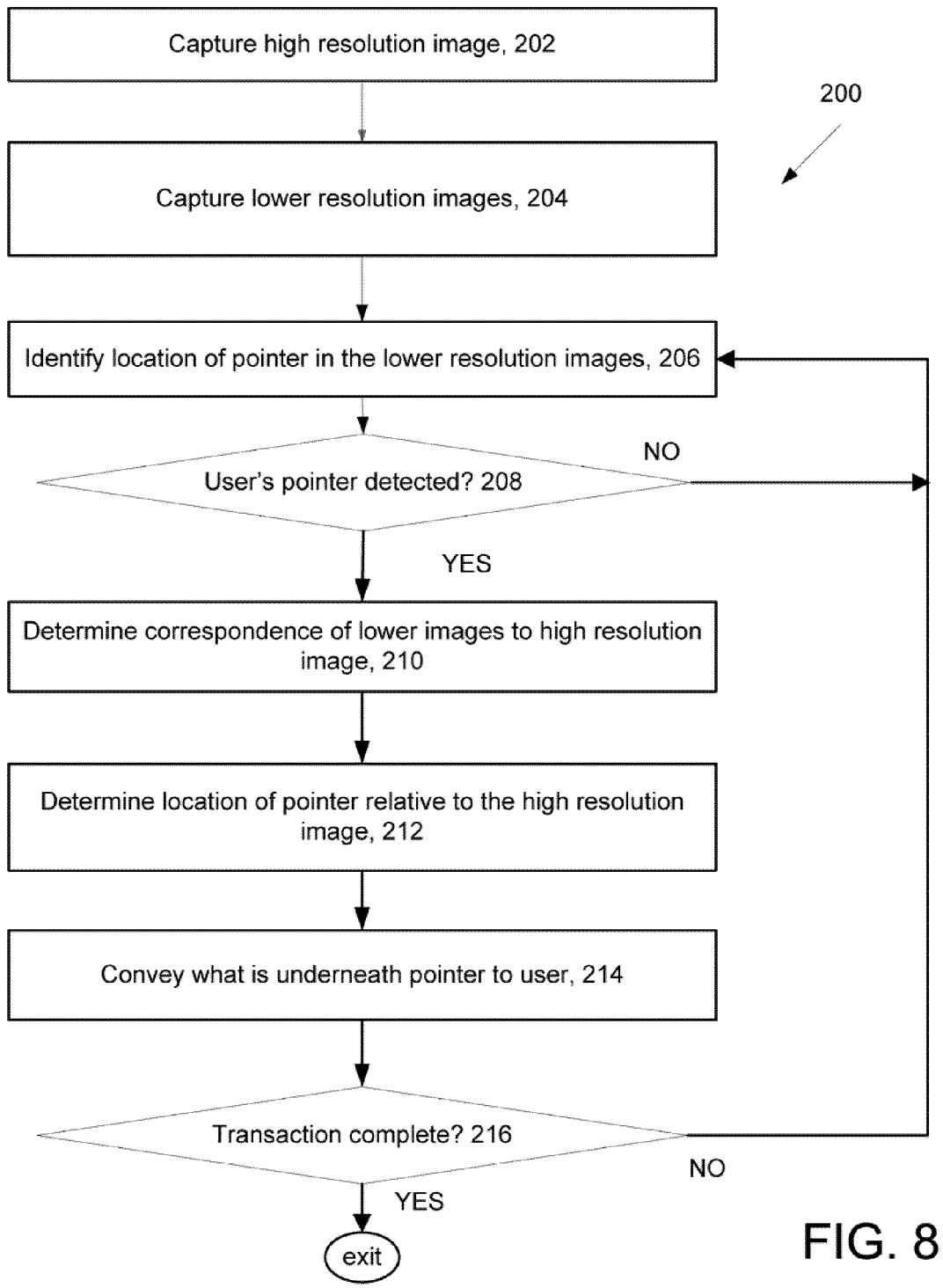
FIG. 8 is a flow chart for a directed reading mode.

Referring now to FIG. 8, a directed reading mode 200 is shown. In directed reading, the user "directs" the portable reading machine's attention to a particular area of an image in order to allow the reading machine to read that portion of the image to the user. One type of directed reading has the user using a physical pointing device (typically the user's finger) to point to the physical scene from which the image was taken. An example is a person moving a finger over a button panel at an ATM, as discussed above. In another type of directed reading, the user uses an input device to indicate the part of a captured image to read.

When pointing on a physical scene, e.g., using a finger, light pen, or other object or effect that can be detected via scanning sensors and superimposed on the physical scene, the directed reading mode 200 causes the portable reading machine to capture 202 a high-resolution image of the scene on which all relevant text can be read. The high resolution image may be stitched together from several images. The portable reading machine also captures 204 lower resolution images of the scene at higher frame rates in order to identify 206 in real-time the location of the pointer. If the user's pointer is not detected 208, the process can inform the user, exit, or try another image.

The portable reading machine determines 210 the correspondence of the lower resolution image to the high-resolution image and determines 212 the location of the pointer relative to the high-resolution image. The portable reading machine conveys 214 what is underneath the pointer to the user. The reading machine conveys the information to the user by referring to one of the high-resolution images that the reading machine took prior to the time the pointer moved in front of that location. If the reading machine times out, or receives 216 a signal from the user that the transaction was completed then the reading machine 10 can exit the mode.

The reading machine converts identified text on the portion of the image to a text file using optical character recognition (OCR) technologies. Since performing OCR can be time consuming, directed reading can be used to save processing time and begin reading faster by selecting the portion of the image to OCR, instead of performing OCR on the entire image. The text file is used as input to a text-to-speech process that converts the text to electrical signals that are rendered as speech. Other techniques can be used to convey information from the image to the user. For instance, information can be sent to the user as sounds or tactile feedback individually or in addition to speech.

The actual resolution and the frame rates are chosen based the available technology and processing power. The portable reading machine may pre-read the high-resolution image to increase its responsiveness to the pointer motion.

Directed reading is especially useful when the user has a camera mounted on eyeglasses or in such a way that it can "see" what's in front of the user. This camera may be lower resolution and may be separate from the camera that took the high-resolution picture. The scanning sensors could be built into reading glasses described above. An advantage of this configuration is that adding scanning sensors into the reading glasses would allow the user to control the direction of scanning through motion of the head in the same way that a sighted person does to allow the user to use the glasses as navigation aids.

An alternate directed reading process can include the user directing the portable reading machine to start reading in a specific area of a captured image. An example is the use of a stylus on a tablet PC screen. If the screen area represents the area of the image, the user can indicate which areas of the image to read.

In addition to the embodiments discussed above, portable scanners can alternatively be used to provide an image representation of a scene. Portable scanners can be a source of image input for the portable reader 10. For example, handheld scanners that assemble an image as the scanner is moved across a scene, e.g., a page, can be used. Thus, the input could be a single image of a page or scene from a portable scanner or multiple images of a page or scene that are "stitched" together to produce an electronic representation of the page or scene in the portable reading machine. The multiple images can be stitched together using either "image stitching" or "text stitching" for scanners or cameras having lower resolution image capture capability. The term "page" can represent, e.g., a rectilinear region that has text or marks to be detected and read. As such, a "page" may refer to a piece of paper, note card, newspaper page, book cover or page, poster, cereal box, and so forth.

Reading Machine With Customized Hardware

Referring to FIG. 9, an alternative 230 of reading machine includes a signal processor 232 to provide image capture and processing. The signal processor 232 is adapted for Image Processing, optical character recognition (OCR) and Pattern Matching. Image processing, OCR and pattern matching are computationally intensive. In order to make Image processing, OCR, and pattern matching faster and more accurate, the portable reader 10 use hardware that has specialized processors for computation, e.g., signal processor 232. The user controls the function of the portable reading machine 230 using standard input devices found on handheld devices, or by some of the other techniques described below.

The portable reading machine 10 can include a scanning array chip 231 to provide a pocket-sized scanner that can scan an image of a full page quickly. The reader may use a mobile phone or handheld computers based on processors 232 such as the Texas Instruments OMAP processor series, which combines a conventional processor and a digital signal processor (DSP) in one chip. The portable reading machine 10 would include memory 233 to execute in conjunction with the processor various functions discussed below and storage 233a to hold algorithms and software used by the reading machine. The portable reading machine would include a user interface 234, I/O interfaces 235, network interfaces (NIC) 236 and optionally a keypad and other controls.

The portable reader may also use an external processing subsystem 238 plugged into a powered card slot (e.g. compact flash) or high speed I/O interface (e.g. USB 2.0) of the portable reader. The subsystem 238 stores executable code and reference information needed for image processing, OCR or pattern recognition, and may be pre-loaded or updated dynamically by the portable reader. The system could be the user's PC or a remote processing site, accessed through wireless technology (e.g. WiFi), located in any part of the world. The site may be accessed over the Internet. The site may be specialized to handle time-consuming tasks such as OCR, using multiple servers and large databases in order to process efficiently. The ability of the processing subsystem to hold the reference information reduces the amount of I/O traffic between the card and the portable reader. Typically, the reader 10 may only need to send captured image data to the subsystem once and then make many requests to the subsystem to process and analyze the different sections of the image for text or shapes.

The portable reading machine 10 includes features to improve the quality of a captured image. For instance, the portable reading machine could use image stabilization technology found in digital camcorders to keep the text from becoming blurry. This is especially important for smaller print or features and for the mobile environment.

The portable reading machine 10 can include a digital camera system that uses a zoom capability to get more resolution for specific areas of the image. The portable reading machine can use auto balancing or a range of other image enhancement techniques to improve the image quality. The portable reading machine could have special enhancement modes to enhance images from electronic displays such as LCD displays.

Image Adjusting

Figure 10:
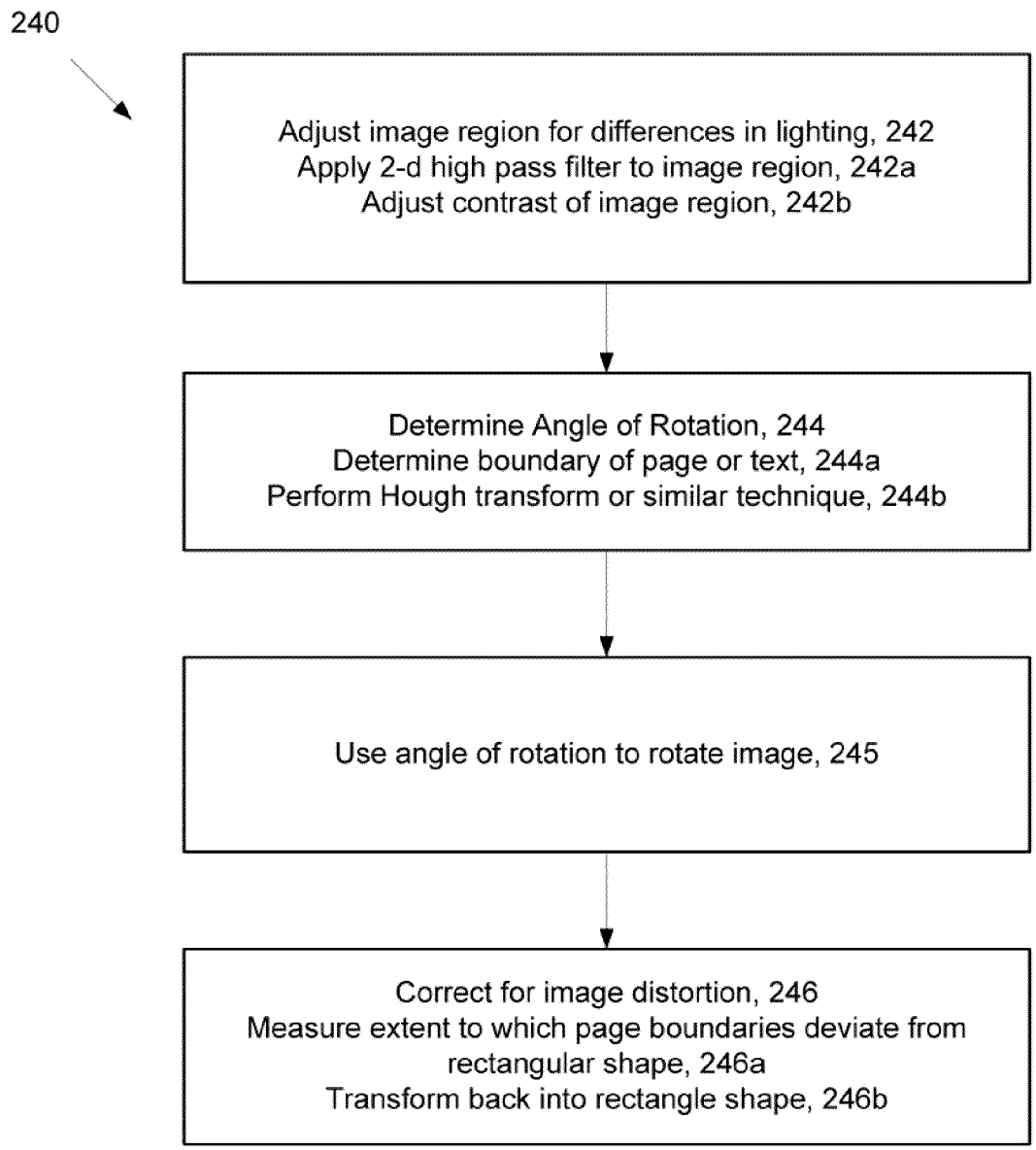
FIG. 10 is a flow chart depicting image adjustment processing.

Referring to FIG. 10, various image adjusting techniques 240 are applied to the image. For example, OCR algorithms typically require input images to be monochromatic with low bit resolution. In order to preserve the relevant text information, the process of converting the raw image to a form suitable for OCR usually requires that the image be auto-balanced to produce more uniform brightness and contrast. Rather than auto-balance the entire image as one, the portable reading machine may implement an auto-balancing algorithm that allows different regions of the image to be balanced differently 242. This is useful for an image that has uneven lighting or shadows. An effective technique of removing regional differences in the lighting intensity is to apply 242a a 2-dimensional high pass filter to the color values of the image (converting each pixel into black or white), and apply 242b a regional contrast enhancement that adjusts the contrast based on determined regional distribution of the intensity.

Image rotation can dramatically improve the reading of a page by the OCR software. The entire page can be rotated, or just the text, or just a section of the text. The angle of rotation needed to align the text may be determined 244 by several techniques. The boundaries of the page or text determine 244a the angle of rotation needed. The page boundaries may be determined by performing edge detection on the page. For text, it may be most useful to look at the top and bottom edges to determine the angle.

The angle of rotation can also be determined using a Hough transform or similar techniques 244b that project an image onto an axis at a given angle (discussed in more detail below). Once the angle of rotation has been determined, the image can be rotated 245.

The portable reading machine may correct 246 for distortion in the page if the camera is tilted with respect to the page. This distortion is detected 246a by measuring the extent to which the page boundaries deviate from a simple rectangular shape. The portable reading machine corrects 246b for the optical distortion by transforming the image to restore the page to a rectangular shape.

Camera Tilt

Figure 11:
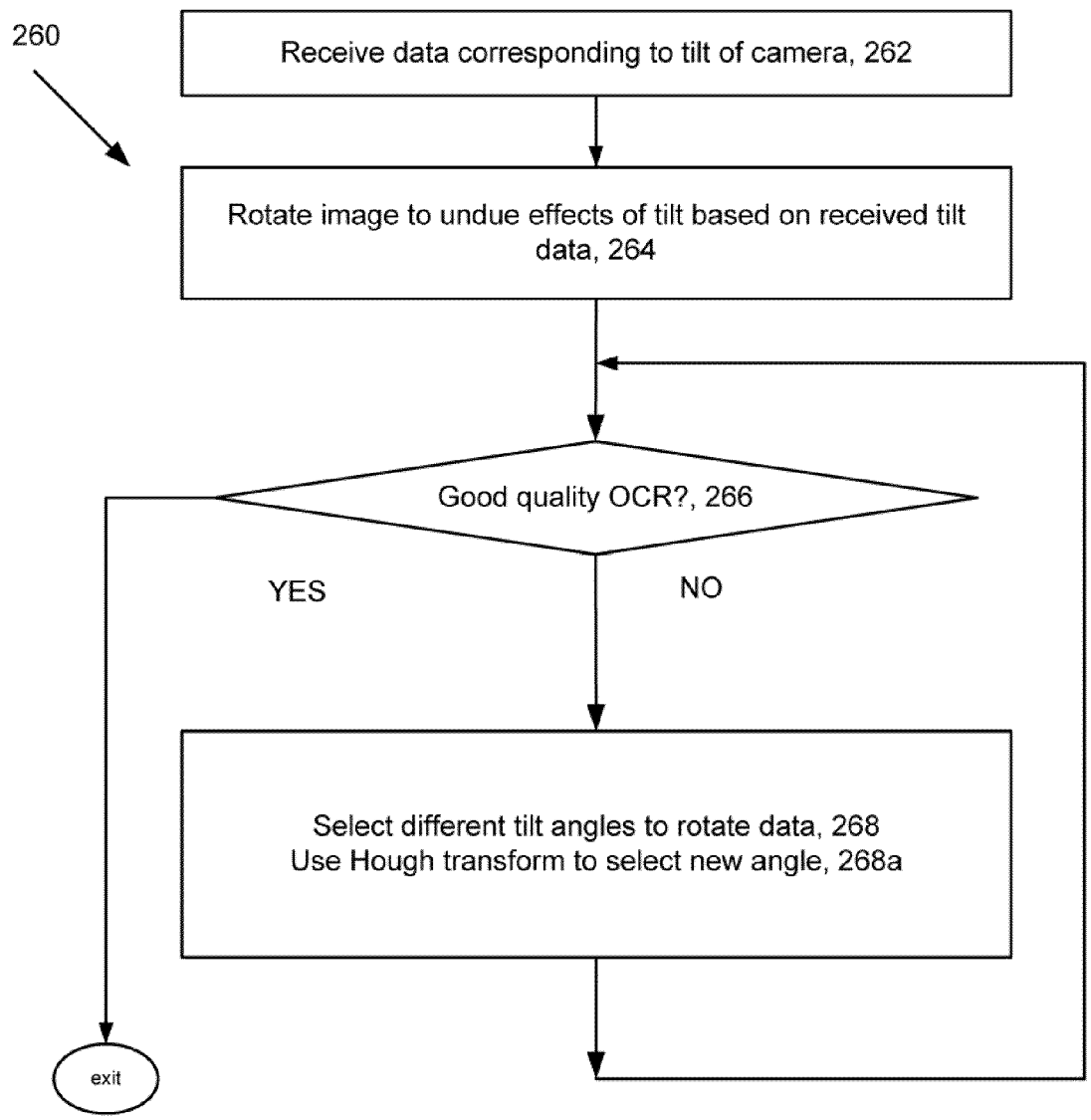
FIG. 11 is a flow chart depicting a tilt adjustment.

Referring to FIG. 11, the portable reading machine incorporates sensors to measure the side-to-side and front-to-back tilt of the camera relative to vertical. This information may be incorporated into a tilt adjustment process 260 for the image rotation determination process 244, discussed above.

The portable reader receives 262 data from sensors corresponding to the tilt of the camera and rotates 264 the image to undo the effect of the tilt. For example, if the portable reading machine takes a picture of a door with sign on it, and the camera is tilted 20 degrees to the left, the image taken by the portable reading machine contains text tilted at 20 degrees. Many OCR algorithms may not detect text at a tilt angle of 20 degrees; hence, the sign is likely to be read poorly, if at all. In order to compensate for the limitations of the OCR algorithms, the portable reading machine 10 mathematically rotates the image and processes the rotated image using the OCR. The portable reading machine uses the determined tilt data as a first approximation for the angle that might yield the best results. The portable reading machine receives 266 a quality factor that is the number of words recognized by the OCR. The number of words can be determined in a number of ways, for example, a text file of the words recognized can be fed to a dictionary process (not shown) to see how many of them are found in the dictionary. In general, if that data does not yield adequate results, the portable reading machine can select 268 different rotation angles and determines 266 which one yields the most coherent text.

A measurement of tilt is useful, but it is usually augmented by other strategies. For example, when reading a memo on a desk, the memo may not be properly rotated in the field of view to allow accurate OCR. The reading machine can attempt to estimate the rotation by several methods. It can perform edge detection on the image, looking for edge transitions at different angles. The largest of the detected edges are likely to be related to the boundaries of the memo page; hence, their angle in the image provides a good clue as to what rotation of the page might yield successful OCR.

Selecting the best rotation angle can be determined using the Hough transform or similar techniques 268a. These techniques examine a projection of the image onto an axis at a given angle. For purposes of this explanation, assume the color of the text in an image corresponds to a value of 1 and the background color corresponds to a value of 0. When the axis is perpendicular to the orientation of the text, the projection yields a graph that that is has periodic amplitude fluctuations, with the peaks corresponding to lines of text and the valleys corresponding to the gaps between. When the axis is parallel to the lines of text, the resulting graph is smoother. Finding the angles that yield a high amplitude periodicity, one can provide a good estimate for an angle that is likely to yield good OCR results. The spatial frequency of the periodicity gives the line spacing, and is likely to be a good indicator of the font size, which is one of the factors that determine the performance of an OCR algorithm.

Detecting Incomplete Pages

Figure 12:
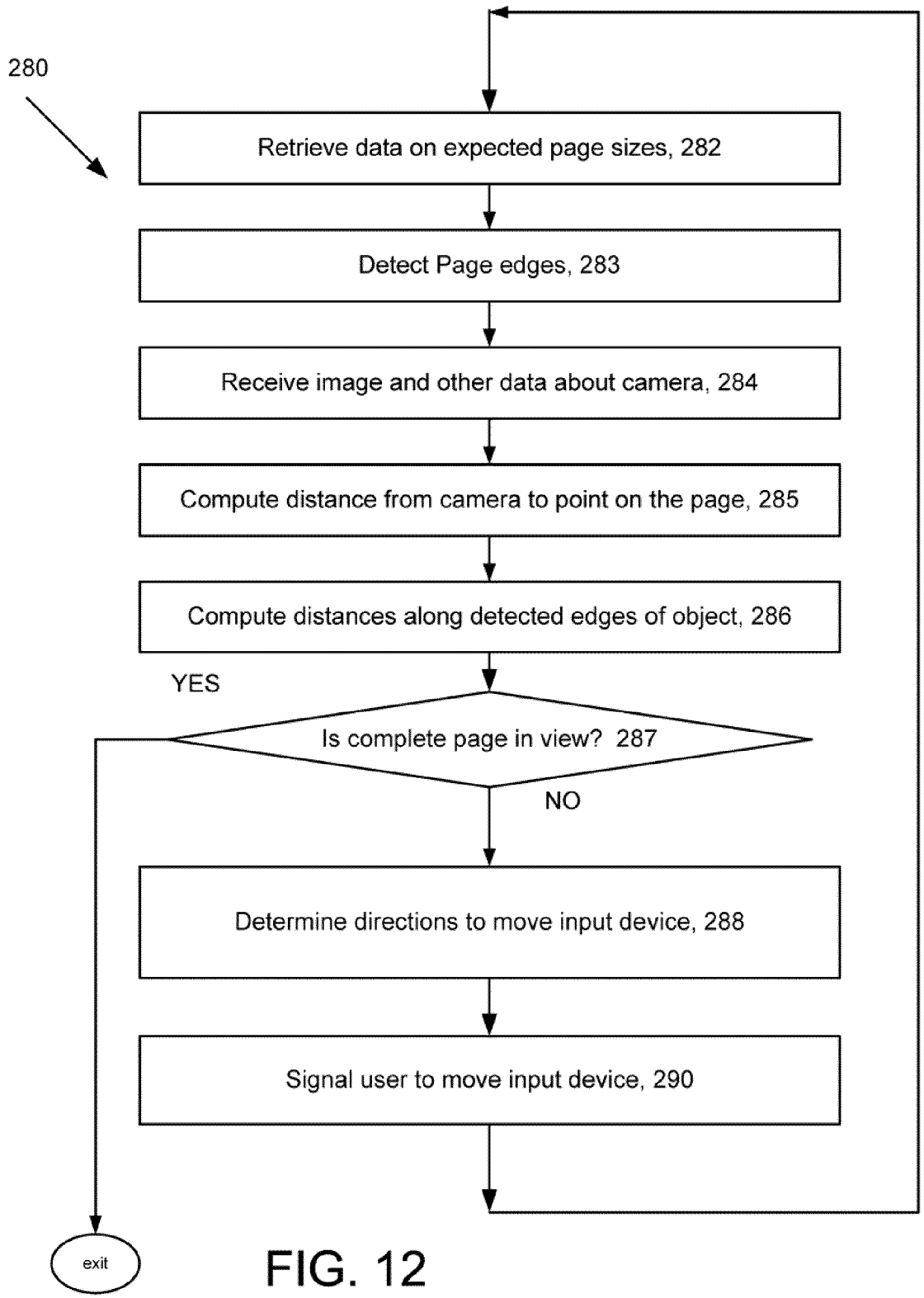
FIG. 12 is a flow chart depicting incomplete page detection.

Referring to FIG. 12, a process 280 is shown to detect that part of a page is missing from the image, and to compute a new angle and convey instructions to the user to reposition or adjust the camera angle. In one operational mode 280, the reading machine retrieves 282 from the knowledge base or elsewhere expected sizes of standard sized pages, and detects 283 features of the image that represent rectangular objects that may correspond to the edges of the pages. The reading machine receives 284 image data, camera settings, and distance measurements from the input device and/or knowledge base. The input device, e.g. a camera, can provide information from its automatic focusing mechanism that relates to the distance from the lens to the page 285.

Figure 12A:
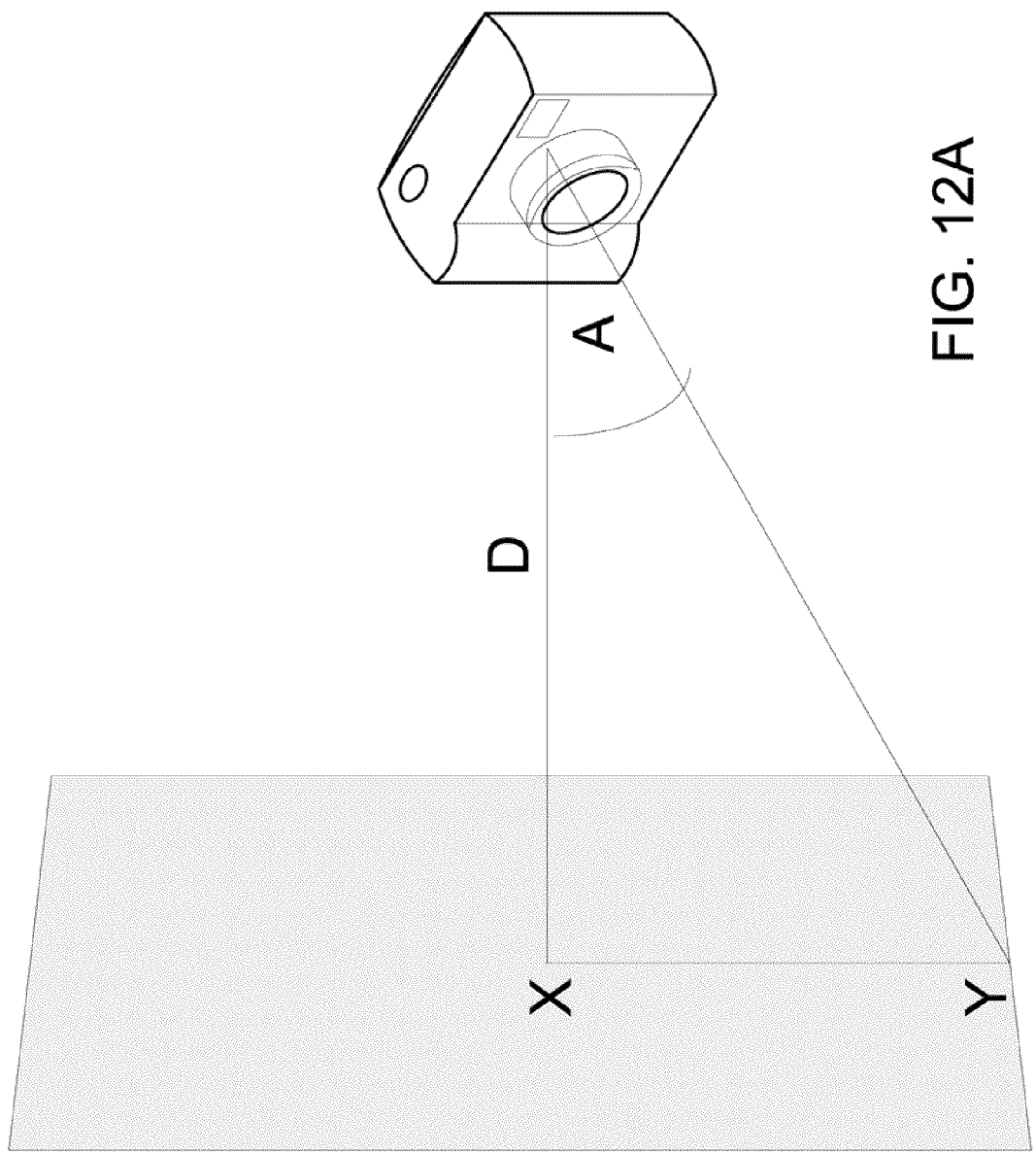
FIG. 12A is a diagram useful in understanding relationships in the processing of FIG. 12.

Referring to FIG. 12A, the reading machine can compute the distance D from the camera to a point on the page X using the input distance measurements. Using the distance D and the angle A between any other point Y on the page and X, the distance between X and Y can be computed using basic geometry, and also the distance between any two points on the page. The reading machine computes 285 the distance D from the camera to a point on the page X using the input distance measurements.

Returning to FIG. 12, the reading machine computes 286 the distances of the detected edges. The reading machine uses the measured distances of the detected edges and the data on standard sizes of pages to determine 287 whether part of a page is missing.

For example, the reading machine can estimate that one edge is 11 inches, but determines that the edge of a sheet perpendicular to the 11 inch edge only measures 5 inches. The reading machine 10 would retrieve data from the knowledge base indicating that a standard size of a page with an 11 inch dimension generally accompanies an 8.5 inch dimension. The reading machine would determine directions 288 to move the input device and signal 290 the user to move the input device to either the left or right, up or down because the entire rectangular page is not in its field of view. The reading machine would capture another image of the scene after the user had reset the input device on the reading machine and repeat the process 280. When the reading machine detects what is considered to be a complete page, process 280 exits and another process, e.g., a reading process, can convert the image using OCR into text and then use speech synthesis to read the material back to a user.

In another example, the portable reading machine may find the topmost page of a group of pages and identify the boundaries. The reading machine reads the top page without being confused and reading the contents of a page that is beneath the page being read, but has portions of the page in the field of view of the image. The portable reading machine can use grammar rules to help it determine whether adjacent text belongs together. The portable reading machine can use angles of the text to help it determine whether adjacent text belongs together. The portable reading machine can use the presence of a relatively uniform gap to determine whether two groups of text are separate documents/columns or not.

Detecting Columns of Text

In order to detect whether a page contains text arranged in columns, the portable reading machine can employ an algorithm that sweeps the image with a 2-dimensional filter that detects rectangular regions of the page that have uniform color (i.e. uniform numerical value). The search for rectangular spaces will typically be done after the image rotation has been completed and the text in the image is believed to be properly oriented. The search for a gap can also be performed using the projection of the image onto an axis (Hough transform) as described earlier. For example, on a image with two columns, the projection of the page onto an axis that is parallel to the orientation of the page will yield a graph that has a relatively smooth positive offset in the region corresponding to the text and zero in the region corresponding to the gap between the columns.

Object Re-Sizing

One of the difficulties in dealing with real-world information is that the object in question can appear as a small part of an image or as a dominant element of an image. To deal with this, the image is processed at different levels of pixel resolution. For example, consider text processing. Text can occur in an object in variety of font sizes. For example, commercially available OCR software packages will recognize text in a digitized image if it is approximately 20 to 170 pixels in height.

Figure 13:
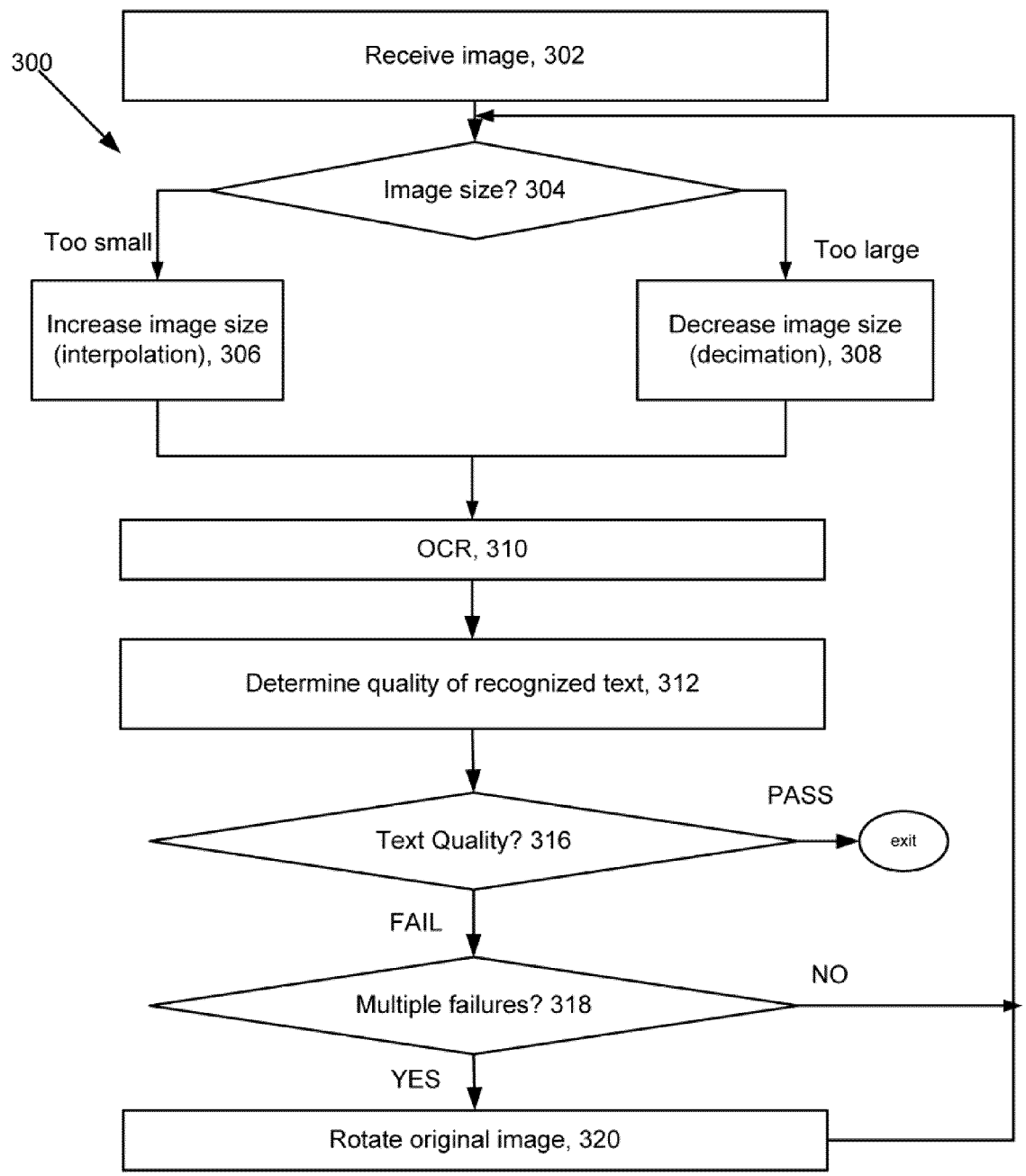
FIG. 13 is a flow chart depicting image decimation/interpolation processing for determining text quality.

Referring to FIG. 13, an object re-sizing process 300 that re-sizes text to allow successful OCR is shown. The process receives 302 an image and decides 304 if the text is too large or small for OCR. The Hough transform, described above, can provide an estimate of text size. The reading machine 10 may inform the user of the problem at this point, allowing the user to produce another image. The reading machine will attempt to re-size the image for better OCR as follows. If the text is too small, the process can mathematically double the size of the image and add in missing pixels using an interpolation 306 process. If the text is too large, the process can apply decimation 308 to reduce the size of the text. The process 300 determines decimation ratios by the largest expected size of the print. The process 300 chooses decimation ratios to make the software efficient (i.e. so that the characters are at a pixel height that makes OCR reliable, but also keeps it fast). The decimation ratios are also chosen so that there is some overlap in the text, i.e., the OCR software is capable of recognizing the text in two images with different decimation ratios. This approach applies to recognition of any kind of object, whether objects such as text characters or a STOP sign.

Several different re-sizings may be processed at one time through OCR 310. The process determines 312 the quality of the OCR on each image by, for example, determining the fraction of words in the text that are in its dictionary. Alternatively, the process can look for particular phrases from a knowledge base or use grammar rules to determine the quality of the OCR. If the text quality 316 passes, the process is complete, otherwise, more re-sizings may be attempted. If the process determines that multiple attempts at re-sizing have occurred 318 with no improvement, the process may rotate 320 the image slightly and try the entire re-sizing process again.

Most algorithms that detect objects from the bitmap image have limitations on the largest and smallest size of the object that they are configured to detect, and the angles at which the objects are expected to appear. By interpolating 302 the image to make the smaller features represent more pixels, or decimating 304 the image to make larger objects represent fewer pixels, or rotating 314 the image that is presented to the detection algorithm, the portable reading machine can improve its ability to detect larger or small instances of the objects at a variety of angles.

The process of separating print from background includes identifying frames or areas of print and using OCR to identify regions that have meaningful print from regions that generate non-meaningful print (that result from OCR on background images). Language based techniques can separate meaningful recognized text from non-meaningful text. These techniques can include the use of a dictionary, phrases or grammar engines. These techniques will use methods that are based on descriptions of common types of real-world print, such as signs or posters. These descriptions would be templates or data that were part of a "modes" knowledge base supported by the reading machine, as discussed above.

Image Stitching

Figure 14:
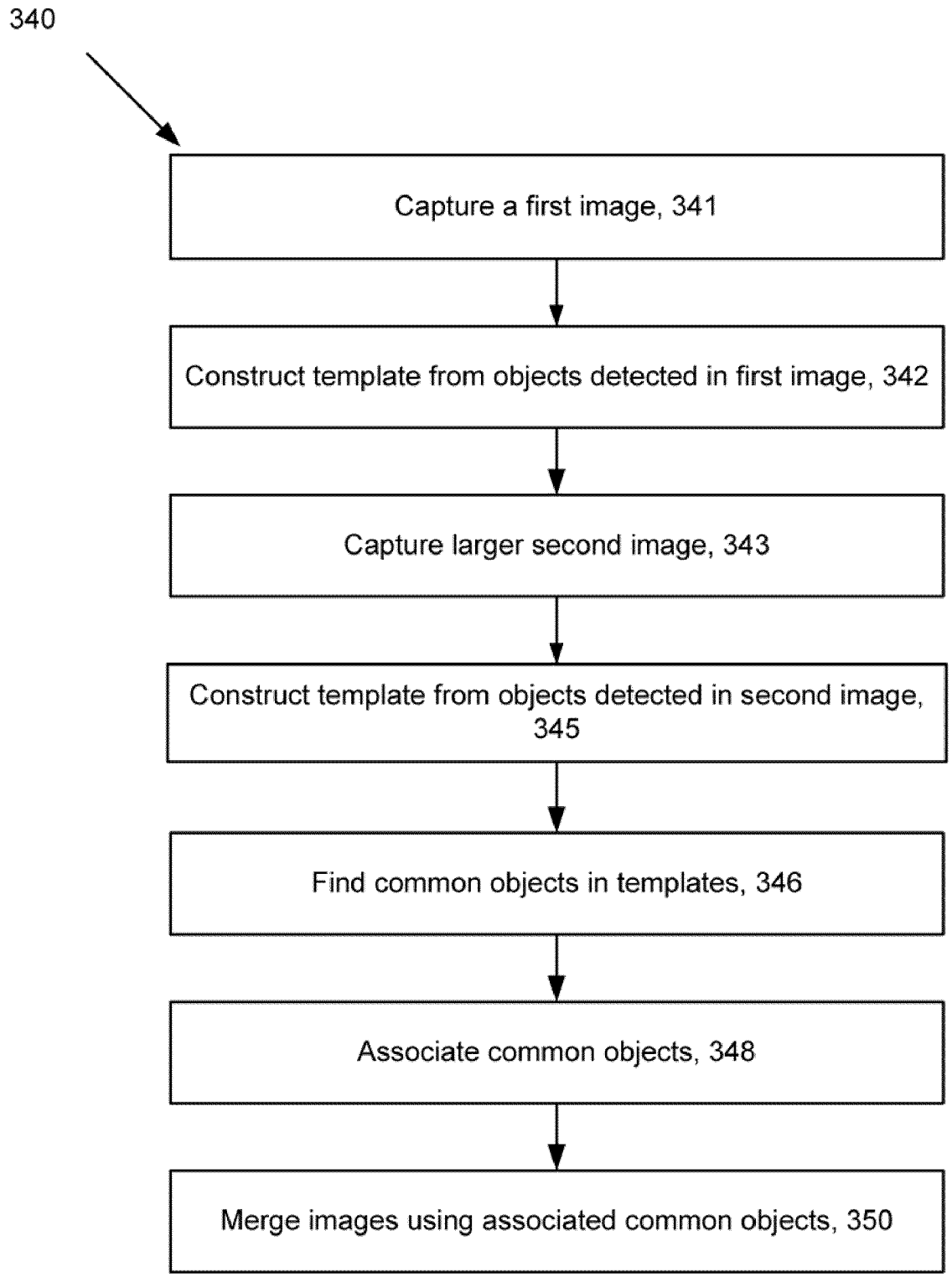
FIG. 14 is a flow chart depicting image stitching.

Referring to FIG. 14, an image stitching process 340 is shown. The reading machine 10 stitches multiple images together to allow larger scenes to be read. Image stitching is used in other contexts, such as producing a panorama from several separate images that have some overlap. The stitching attempts to transform two or more images to a common image. The reading machine may allow the user to take several pictures of a scene and may piece together the scene using mathematical stitching.

Because the visually impaired person is not as able to control the amount of scene overlap that exists between the individual images, the portable reading machine may need to implement more sophisticated stitching algorithms. For example, if the user takes two pictures of a wall that has a poster on it, the portable reading machine, upon detecting several distinct objects, edges, letters or words in one image, may attempt to detect these features in the other image. In image stitching process 340, the portable reading machine 10 captures 341 a first image and constructs 342 a template from the objects detected in the first image of the series of images. The image stitching process captures 343 a larger second image by scanning a larger area of the image than would typically be done, and allows for some tilt in the angle of the image. The image stitching process 340 constructs 345 a second template from detected objects in the second image. The image stitching process 340 compares the templates to find common objects 346. If common objects are found, the image stitching process associates 348 the detected common objects in the images to mathematically transform and merge 350 the images together into a common image.

Text Stitching

For memos, documents and other scenes, the portable reading machine may determine that part of the image has cut off a frame of text, and can stitch together the text from two or more images. Referring to FIG. 15, a text stitching process 360 is shown. Text stitching is performed on two or more images after OCR 362. The portable reading machine 10 detects and combines ("stitches") 363 common text between the individual images. If there is some overlap between two images, one from the left and one from the right, then some characters from the right side of the left image are expected to match some characters from the left side of the right image. Common text between two strings (one from the left and one from the right) can be detected by searching for the longest common subsequence of characters in the strings. Other algorithms can be used. A "match measure" can also be produced from any two strings, based on how many characters match, but ignoring, for example, the mismatches from the beginning of the left string, and allowing for some mismatched characters within the candidate substring (due to OCR errors). The machine 10 can produce match measures between all strings in the two images (or all strings that are appropriate), and then use the best match measures to stitch the text together from the two images. The portable reading machine 10 may stitch together the lines of text or individual words in the individual images.

The portable reading machine uses text stitching capability and feedback to the user to combine 363 text in two images. The portable reading machine will determine 364 if incomplete text phrases are present, using one or more strategies 365. If incomplete text phrases are not present then the text stitching was successful. On the other hand, if the portable reading machine detected incomplete text phrases, the portable reading machine signals 366 the user when incomplete text phrases are detected, to cause the user to move the camera in a direction to capture more of one or more of the images.

For example, the text stitching process 360 can use some or all of the following typical strategies 365. Other strategies could also be used. If the user takes a picture of a memo, and some of the text lies outside the image, the text stitching process 360 may detect incomplete text by determining 365$a$ that text is very close to the edge of the image (only when there is some space between text and the edge of the image is text assumed to be complete). If words at the edge of the image are not in the dictionary, then it is assumed 365$b$ that text is cut off. The text stitching process 360 may detect 365$c$ occurrences of improper grammar by applying grammar rules to determine whether the text at the edge of the image is grammatically consistent with the text at the beginning of the next line. In each of these cases, the text stitching process 360 gives the user feedback to take another picture. The portable reading machine captures 368 new data and repeats text stitching process 360, returning to stitch lines of text together and/or determine if incomplete text phases were detected. The text stitching process 360 in the portable reading machine 10 combines the information from the two images either by performing text stitching or by performing image stitching and re-processing the appropriate section of the combined image.

Gesturing Processing

In gesturing processing, the user makes a gesture (e.g. with the user's hand) and the reading machine 10 captures the gesture and interprets the gesture as a command. There are several ways to provide gestures to the reading machine, which are not limited to the following examples. The reading machine may capture the motion of a user's hand, or other pointing device, with a video camera, using high frame rates to capture the motion, and low resolution images to allow faster data transfer and processing. A gesture could also be captured by using a stylus on a touch screen, e.g., circling the area of the image on the screen that the user wishes to be read. Another option is to apply sensors to the user's hand or other body part, such as accelerometers or position sensors.

Referring to FIG. 16, gesturing processing 400 is shown. Gesturing processing 400 involves the portable reading machine capturing 402 the gesturing input (typically a series of images of the user's hand). The gesturing processing applies 404 pattern-recognition processing to the gesturing input. The gesturing processing detects 406 a set of pre-defined gestures that are interpreted 408 by the portable reading machine 10, as commands to the machine 10.

The gesturing processing 400 will operate the reading machine 10 according to the detected gesture. For example, upon scanning a scene and recognizing the contents of the scene using processing described above, the portable reading machine 10 receives input from the user directing the portable reading machine 10 to read user defined portions of the scene or to describe to the user, user defined portion of the scene. By default, the reading machine starts, e.g., reading at the beginning of the scene and continues until the end. However, based on gesture input from the user, the reading machine may skip around the scene, e.g. to the next section, sentence, paragraph, and so forth. When the scene is mapped to a template, gesturing commands (or any kinds of commands) can be used to navigate to named parts of the template. For example, if an electricity bill is being read by the reading machine 10, the reading machine 10 uses the bill template and a command can be used to direct the reading machine to read the bill total. The reading machine 10 may spell a word or change the speed of the speech, at the direction of the user. Thus, the reading machine can receive input from the user from, e.g., a conventional device such as a keypad or receives a more advanced input such as speech or an input such as gesturing.

Physical Navigation Assistance

The portable reading machine 10 allows the user to select and specify a feature to find in the scene (e.g. stairs, exit, specific street sign or door number). One method to achieve this is through speech input. For example, if the user is in a building and looking for an exit, the user may simply speak "find exit" to direct the portable reading machine to look for an item that corresponds to an "exit sign" in the scene and announce the location to the user.

The usefulness of the portable reading machine 10 in helping the user navigate the physical environment can be augmented in several ways. For instance, the portable reading machine 10 will store in a knowledge base a layout of the relevant building or environment. Having this information, the portable reading machine 10 correlates features that it detects in the images to features in its knowledge base. By detecting the features, the portable reading machine 10 helps the user identify his/her location or provide information on the location of exits, elevators, rest rooms, etc. The portable reading machine may incorporate the functionality of a compass to help orient the user and help in navigation.

Poor Reading Conditions

Figure 17:
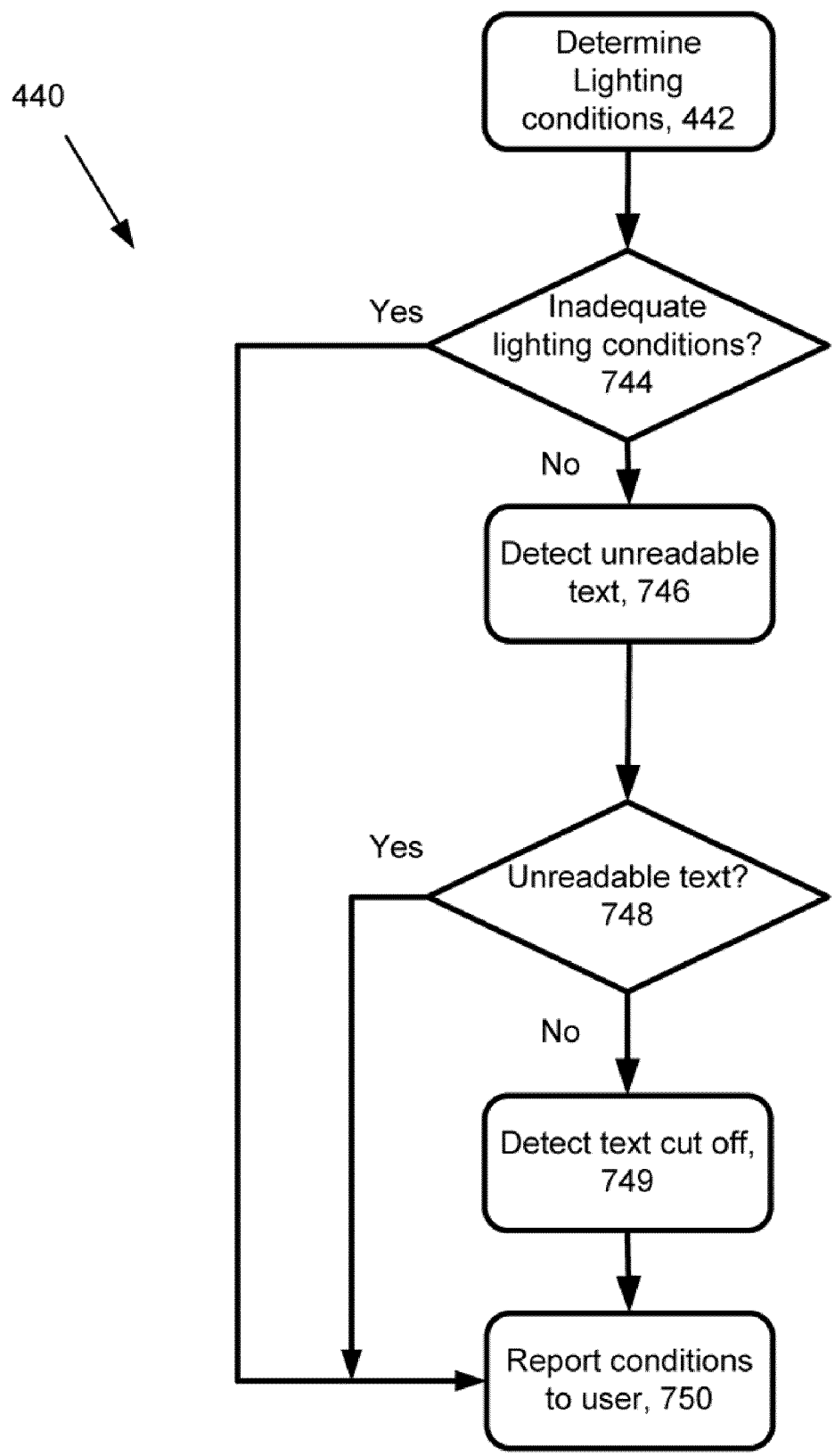
FIG. 17 is a flow chart depicting poor reading conditions processing.

Referring to FIG. 17, processing 440 to operate the reading machine under poor reading conditions is shown. The portable reading machine 10 may give the user feedback if the conditions for accurate reading are not present. For example, the portable reading machine 10 determines 442 lighting conditions in a captured image or set of images. The reading machine 10 determines lighting conditions by examining contrast characteristics of different parts of the image. Such regional contrast of an image is computed by examining a distribution of light intensities across a captured image. Regions of the captured image that have poor contrast will be characterized by a relatively narrow distribution of light intensity values compared to regions of good contrast.

Poor contrast may be present due to lighting that is too dim or too bright. In the case of dim lighting, the mean value of the light intensity will be low; in the case of excessive lighting, the mean value of the light intensity will be high. In both cases, the distribution of light intensities will be lower than under ideal lighting conditions.

The portable reading machine can also look for uneven lighting conditions by examining the brightness in different regions of the image. An important condition to detect in the captured image is the presence of glare. Digital video sensors do not have the same dynamic range as the human eye, and glare tends to saturate the image and blur or obscure text that may be present in the image. If the portable reading machine detects a region of the image, such as a rectangular region that may correspond to a page, or a region that has text, and the portable reading machine detects that part or all of that region is very bright, it may give the user feedback if it cannot detect text in that region.

If poor contrast conditions or uneven lighting conditions are present, the machine 10 would have detected poor lighting conditions 744. The portable reading machine can give the user feedback 750 as to whether the scene is too bright or dark.

The portable reading machine may also detect 746 and report 748 incomplete or unreadable text, using the same strategies listed above, in 365 (FIG. 15).

For memos, documents and other scenes that have rectangular configurations containing text, the portable reading machine may determine 749 that part of the text has been cut off and inform the user 750, e.g., using the same techniques as described above in FIG. 12.

The portable reading machine can determine if text is too small. If the portable reading machine identifies the presence of evenly spaced lines using the methodology described previously, but is unable to perform OCR that yields recognizable words and grammar, the portable reading machine can notify 750 the user. Other possible conditions that lead to poor reading include that the text is too large.

Describe Scene to User

On a surface with multiple pages (rectangular objects) the device may "describe" the scene to the user. The description may be speech or an acoustic "shorthand" that efficiently conveys the information to the user. Door signs, elevator signs, exit signs, etc. can be standardized with specific registration marks that would make it easier to detect and align their contents.

Coordinates

The portable reading machine may specify the location of identified elements in two or three dimensions. The portable reading machine may communicate the location using a variety of methods including (a) two or three dimensional Cartesian coordinates or (b) angular coordinates using polar or spherical type coordinates, or (c) a clock time (e.g. 4 pm) and a distance from the user.

The portable reading machine may have an auditory signaling mode in which visual elements and their characteristics that are identified are communicated by an auditory signal that would quickly give the individual information about the scene. The auditory signaling mode may use pitch and timing in characteristic patterns based on what is found in the scene. The auditory signaling mode may be like an auditory "sign language." The auditory signaling mode could use pitch or relative intensity to reflect distance or size. Pitch may be used to indicate vertical position of light or dark. The passage of time may be used to indicate horizontal position of light or dark. More than one pass over the visual scene may be made with these two dimensions coded as pitch and time passage. The auditory signaling mode may use a multi-channel auditory output. The directionality of the auditory output may be used to represent aspects of the scene such as spatial location and relative importance.

Tactile Signaling

Information can be relayed to the user using a tactile feedback device. An example of such a device is an "Optacon" (optical to tactile converter).

Text and Language Information

The device can operate with preferred fonts or font styles, handwriting styles, spoken voice, a preferred dictionary, foreign language, and grammar rules.

Reading Voices

The reading machine may use one voice for describing a scene and a different-sounding voice for reading the actual text in a scene. The reading machine may use different voices to announce the presence of different types of objects. For example, when reading a memo, the text of the memo may be spoken in a different voice than heading or the page layout information.

Selecting a Section of an Image

Figure 17A:
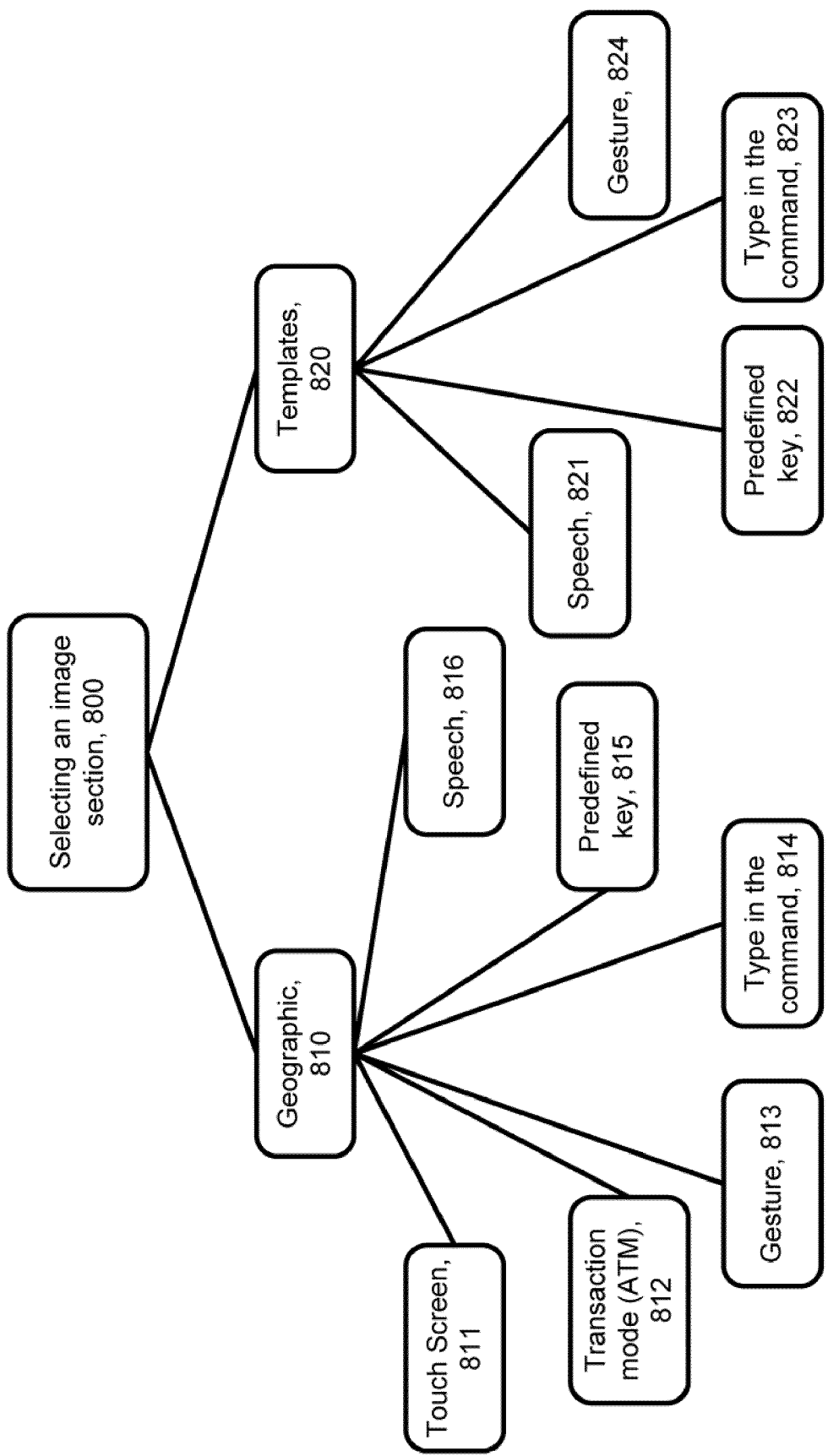
FIG. 17A is a diagram showing different methods of selecting a section of an image.

Referring to FIG. 17A, a number of techniques for selecting a section of an image to process 800 are shown. As previously discussed, the user can select 800 a section of the image for which they want to hear the text read, in a variety of ways, such as referring to where the text lies 810 in the layout ("geographic"), or referring to an element of a template 820 that maps the image ("using a template"). Both the geographic and template types of selection can be commanded by a variety of user inputs: pointing, typing, speaking, gesturing, and so on, each of which is described.

The example of the geographic type of selecting a section of an image is the idea of the user pressing an area of a touchscreen 811, which is showing the image to be processed. The area under the user's finger, and near it, is processed, sent to OCR, and the resulting text, if any, is read to the user. This can be useful for a person of low vision, who can see that the image has been correctly captured, for example, their electricity bill, but cannot read the text in the image, and simply wants to know the total due. The method is also useful for those who are completely blind, in order to quickly navigate around an image. Sending only a part of the image to OCR can also save processing time, if there is a lot of text in the image (see section below on minimizing latency in reading). Thus, being able to select a section of an image to process, whether to save latency time for reading, or provide better user access to the text, is a useful feature.

Other examples of the geographic type of selection include the detection of a finger in a transaction mode 812 (e.g. at an ATM), as previously discussed. Note that a pen or similar device can be used instead of a finger, either in the transaction mode or when using a touchscreen. The reading machine can provide predefined geographic commands, such as "read last paragraph." These predefined commands could be made by the user with a variety of user inputs: a gesture 813 that is recognized to mean the command; typed input 814; a pre-defined key 815 on the device; and speech input 816. For example, a key on the device could cause, when pressed, the last paragraph to be read from the image. Other keys could cause other sections of the image to be read. Other user inputs are possible.

Templates 820 can be used to select an section of the image to process. For example, at an ATM, a template 820 can be used to classify different parts of the image, such as the buttons or areas on the ATM screen. Users can then refer to parts of the template with a variety of inputs. For example, a user at an ATM could say 821 "balance," which would access the template for the current ATM screen, find the "balance" field of the template, determine the content of the field to see where to read the image, and read that part of the image (the bank balance) to the user. There are a variety of user commands that can access a template: speech input 821 (the last example), a pre-defined defined key 822 on the device, typed input 823, and a gesture command 824 that is pre-defined to access a template. Other user inputs are possible.

Minimizing Latency in Reading

Figure 18:
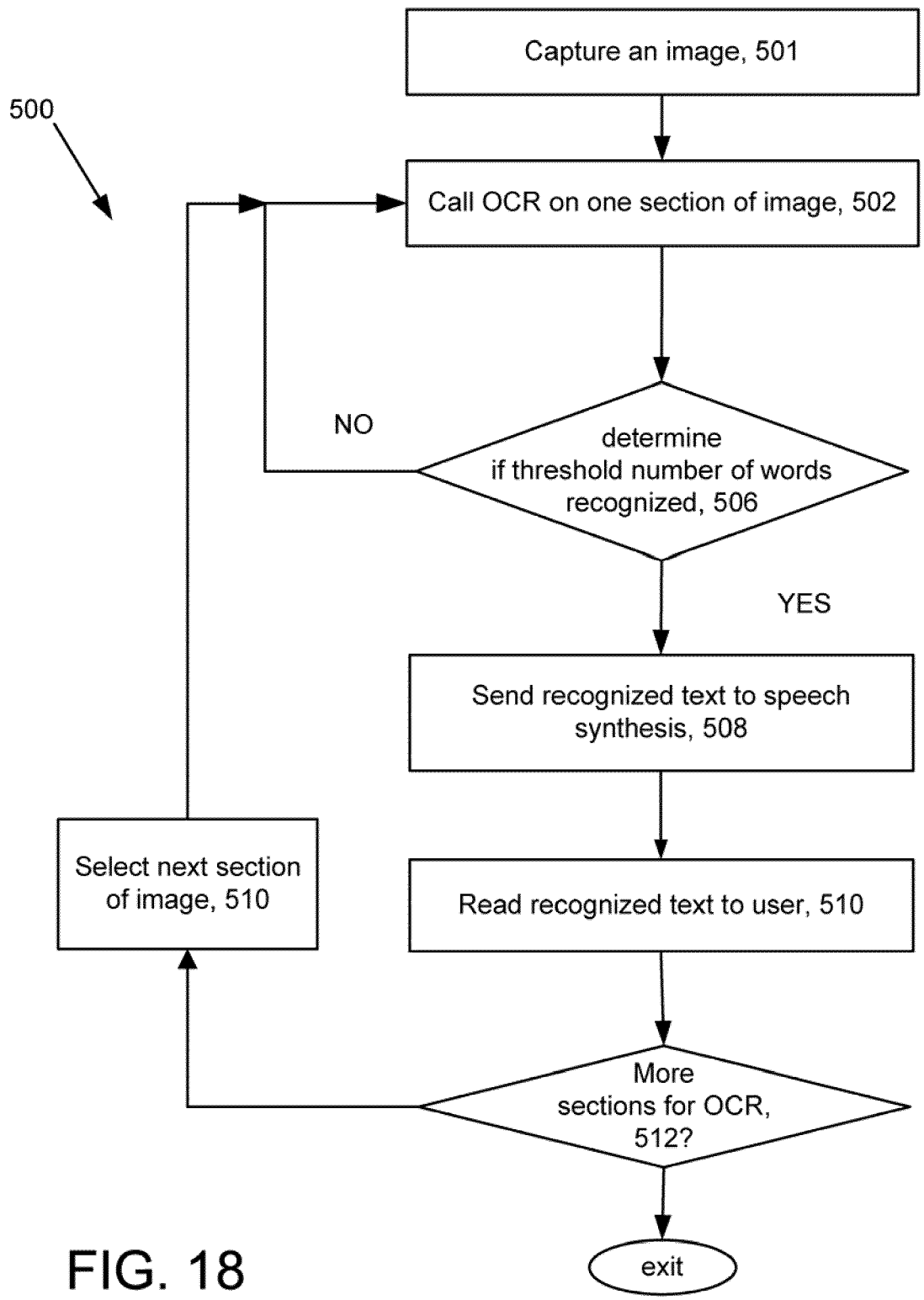
FIG. 18 is a flow chart depicting a process to minimizing latency in reading.

Referring to FIG. 18, a technique 500 to minimize latency in reading text from an image to a user is shown. The technique 500 performs pieces of both optical character recognition and text to speech synthesis at the same time to minimize latency in reading text on a captured image to a user. The reading machine 10 captures 501 an image and calls 502 the optical character recognition software. The process will scan a first section of the image. When the optical character recognition software finds 506 a threshold number of the words on the section of the image, typically, ten to twenty words, the technique 500 causes the reading machine to send 508 the recognized words to a text to speech synthesizer to have the text to speech synthesizer read 510 the words to the user. That is, the technique 500 processes only a part of the image (typically the top of the image) and sends 508 partial converted text to the speech synthesizer, rather than processing the complete image and sending the complete converted text to the speech synthesizer. As optical character recognition processing to find words in an image is typically more CPU intensive than "reading" the words using the text-to-speech (TTS) software, technique 500 minimizes latency, e.g., the time from when an image is captured, to the time when speech is received by the user.

The processing 500 checks if there are more sections in the image 512, and if so selects the next image 514 and thus calls OCR processing 502 for the next portion of the image, and sending partial converted text to the speech synthesizer, so on, until there are no more sections to be recognized by the OCR processing and the process 500 exits. In this way, the device can continually "read" to the user with low latency and no silences.

Different pieces of the image can be processed in different orders. The simplest traversal order is to start at the top of the image and work down, and this is how a typical digital camera would send pieces of the image. Image pieces can also be selected by the user, as previously described, e.g., by: pressing on a corresponding part of a touch screen; using a gesture to describe a command that selects part of the image; speech input (e.g. "read last paragraph"), typed input, and so on. Images pieces can also be selected with the use of a template, as previously described, and a variety of user input. For example, if a template was mapped to the image, the user might use verbal commands to select a part of the template that maps to part of the image, causing the reading machine 10 to process that part of the image.

Another way that the reading machine can save time is by checking for text that is upside down. If the software finds 506 a low number of words recognized, it may change the image orientation by 180 degrees and OCR that. If that produces enough words to surpass the threshold, then the reading machine 10 will process all remaining sections of the image as upside down, thus saving time for all future sections of that image.

Templates

Figure 19:
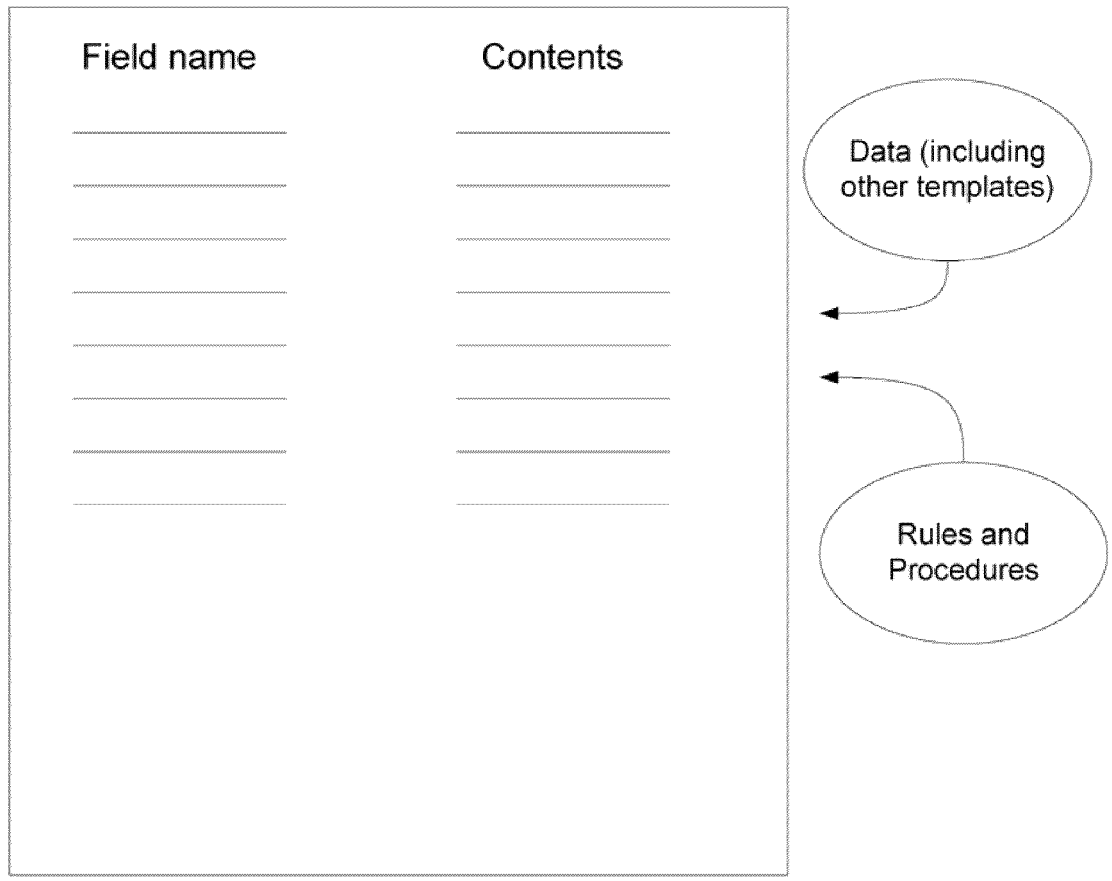
FIG. 19 is a diagram diagrammatically depicting a structure for a template.

Referring to FIG. 19, a template is shown. A template provides a way to organize information, a kind of data structure with several fields. Each field has a name and the associated data for that field (the contents). The template for a document could describe the sections of the document: the body text, chapter title, and footer (e.g. page number). The template for an ATM could have a field for each button and each section of the screen. Templates are used to organize the information in an image, such as the buttons and text on an ATM machine. Templates also specify a pattern, such that templates can be used in pattern matching. For example, the reading machine 10 could have a number of templates for different kinds of ATMs, and could match the image of an ATM with its template based on the layout of buttons in the image.

Templates may contain other templates. For example, a more general template than just described for the page of a book would contain chapter title, footer, and body, where the contents for the body field reference several options for the body, such as a template for the table of contents, a template for plain text, a template for an index, and so forth. The document template could contain rules that help choose which body template to use. Thus, templates can contain simple data, complex data such as other templates, as well as rules and procedures.

Knowledge Base

Figure 20:
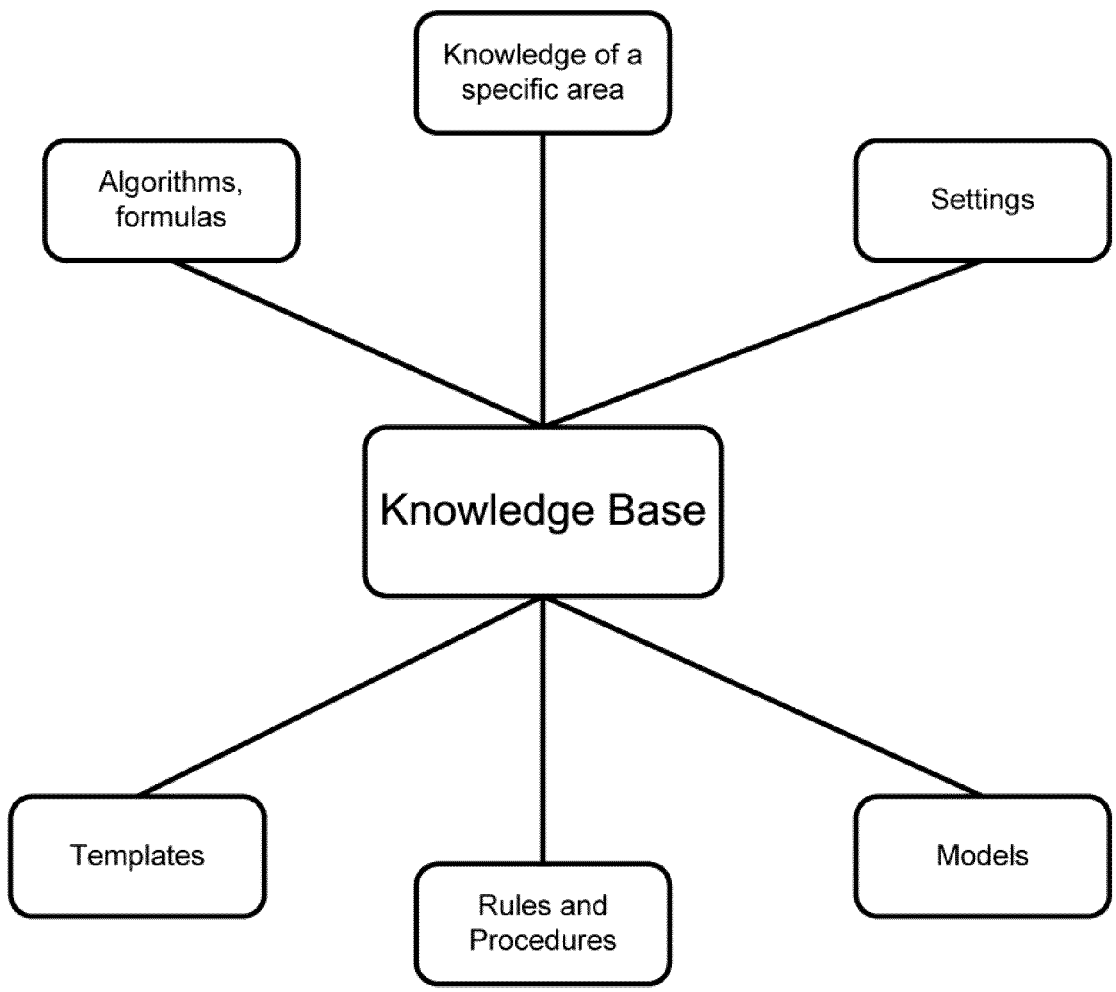
FIG. 20 is a diagram diagrammatically depicting a structure for a knowledge base.

Referring to FIG. 20, a knowledge base is shown. A knowledge base in the reading machine 10 stores information about a particular function of the reading machine 10, such as a mode (e.g. document mode or clothing mode), or a type of hardware (e.g. a camera and its settings), or image processing algorithms. The knowledge base is a collection of reference data, templates, formulas and rules that are used by the portable reader. The data in a knowledge base (or set of knowledge bases), together with algorithms in the reading machine 10 are used to carry out a particular function in the reading machine 10. For example, a knowledge base for document mode could include all the document templates (as previously discussed), the rules for using the different templates, and a model of document processing. A knowledge base for using an ATM would include all the templates for each screen, plus the rules and other knowledge needed for handling ATMs. The knowledge bases may be hierarchical. For example, one knowledge base helps the reader device determine the most appropriate knowledge base to use to process an image.

Model

Figure 21:
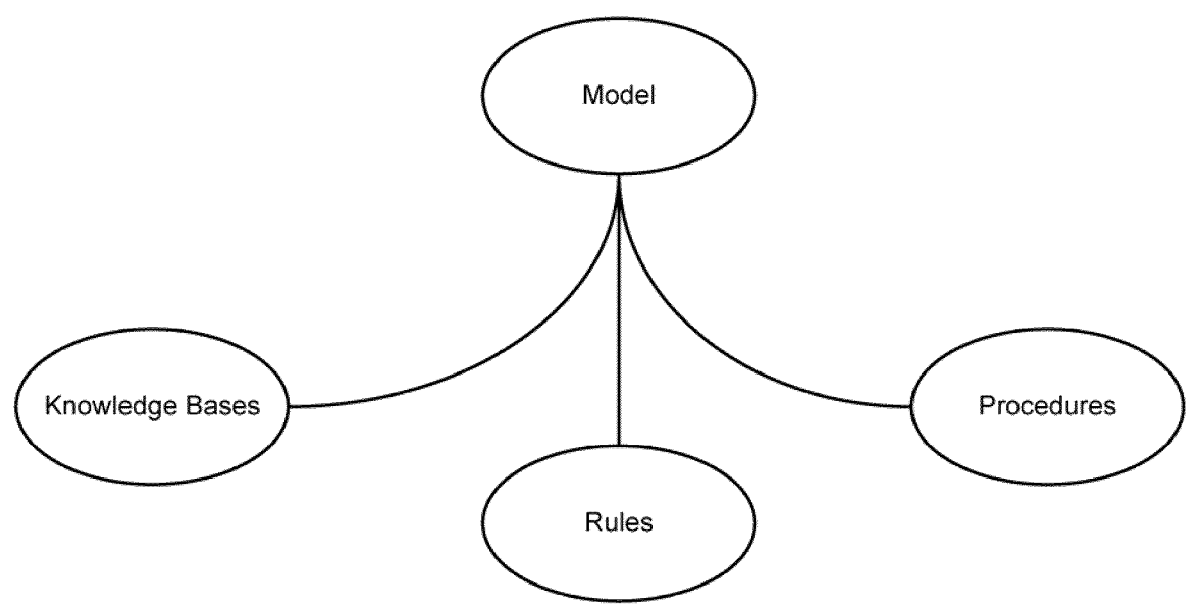
FIG. 21 is a diagram diagrammatically depicting a structure for a model.

Referring to FIG. 21, a model describes an organization of data and procedures that model (or produce a simplified imitation of) some process. A model provides a framework for dealing with the process. A model ties together the necessary knowledge bases, rules, procedures, templates and so on, into a framework for dealing with the mode or interaction or process.

In document mode, the reading machine 10 has a model of how to read a document to the user. A document speed-reading model may collect together rules that read only the section title and first paragraph from each section, and skip the reading of page numbers, whereas other document reading models may collect different reading rules.

The model may be stored in a knowledge base, or the software for the model processing may be implicit in the software of the reading machine 10.

A model may be used to help stitch together the content from multiple images with a common theme or context.

Model-Based Reading and Navigation

When reading a document or a memo, a sighted person will typically read the elements in a particular order, sometimes skipping sections and coming back to re-read or fill in information later.

A model may specify the order in which sections of a document are read by the reading machine 10, or which sections are to be read. A model may specify the order in which the user navigates between the sections when tabbing or paging. A model may specify how the contents of the model are summarized. For example, the model of a nutrition label may define a brief summary to be the fat, carbohydrate and protein measurements. A more detailed summary may include a breakdown of the fats and carbohydrates.

Typically, the models are specified as in a database as rules or data that are interpreted by a software module. However, the rules and data for a models or templates may also be coded directly in the software, so that the model or template is implicit in the software.

Although reading rules are most applicable to printed text and graphics, they can also be applied to reading signs, billboards, computer screens and environmental scenes.

Learning

The reader device is configured so that the reading machine learns either during operation, under direction of the user, or by uploading new libraries or knowledge bases. The reader may be trained from actual images of the target element. For example, the reader device may be trained for face recognition on images of an individual, or for handwriting recognition from writing samples of an individual. The learning process may be confirmed using an interactive process in which a person confirms or corrects some of the conclusions reached by the device. For example, the device may be able to learn a font used in a restaurant menu by reading some parts that the user can understand and confirm.

The reader device may learn new fonts or marks by making templates from a received image. The learning process for a font may include a person reading the text to the device. The reader device uses speech recognition to determine the words and tries to parse the image to find the words and learn the font. In addition to speech input, the reader device may take the text information from a file or keyboard.

Sharing of Knowledge Bases

The reader device is configured so that users can import or export knowledge bases that augment existing modes or produce new modes. The reading machine may be a platform that fosters $3^{rd}$-party development of new applications.

Translation

The device may be able to read text in one language (or multiple languages) and translate to another language that is "read" to the user.

Other Uses

A user may quickly snap images of a series of single or multi-page documents, optionally attaching voice notes to them. The user can listen to the documents at a later date. The device can pre-process the images to do the OCR so that the user can then quickly review the documents later.

The user may snap a picture of the pages of a book or magazine. The device may be set up to skip reading of the title on the top of each page, or to suppress reading the page numbers when reading to the user.

Voice Recognition for Finding Stored Materials

Images or OCR-processed documents may be stored for later recall. A voice note or file name may be specified for the document. The system may allow an interactive search for the stored files based on the stored voice note or on the title or contents of the document.

The user can specify the file name, or may specify the keywords. The system specifies how many candidate files were found and may read their names and/or attached voice notes to the user.

Process Flow Overview

Figure 22:
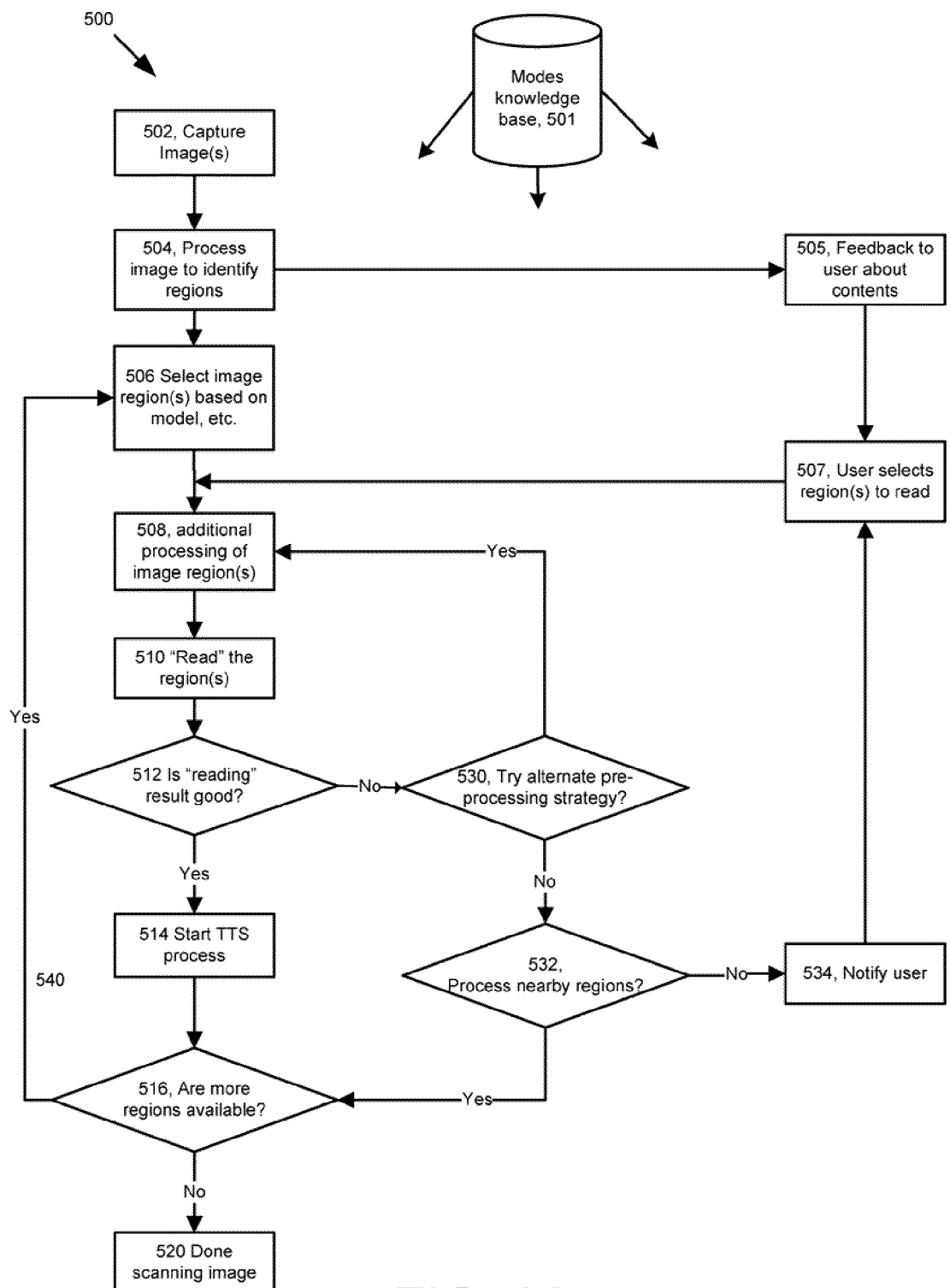
FIG. 22 is a flow chart depicting typical document mode processing.

Referring to FIG. 22, an example 500 of the process flow of a document mode is shown. The templates, layout models, and rules that support the mode are retrieved from a Mode Knowledge base 501. The user causes the reading machine to capture 502 a color or grayscale image of a scene having the document of interest. The user accomplishes this by using the device's camera system to capture consecutive images at different exposure settings, to accommodate situations where differences in light conditions cause a portion of the image to be under or over exposed. If the device detects low light conditions, it may use a light to illuminate the scene.

The device processes 504 the image with the goal of segmenting the image into regions to start reading text to the user before the entire image has been processed by OCR.

One step is to color and contrast balance the images using center weighted filtering. Another step is to parse the image into block regions of monochromatic and mixed content. Another step uses decimation of the image to lower resolution to allow the reading machine to efficiently search for large regions of consistent color or brightness. Another step includes mapping colors of individual regions to dark or light to produce grayscale images. Another step would produce binary images using adaptive thresholding that adjusts for local variations in contrast and brightness. More than one type of enhancement may be performed, leading to more than one output image. The reading machine may search for characteristic text or marks in standardized areas of the document frame.

The reading machine provides 505 the user auditory feedback on the composition of the image. The feedback may include indication of whether the lighting level is too low to detect any regions that might have text. Also, the feedback includes an indication of whether a primary rectangular region (likely to be the document frame) has been detected. The reading machine can also provide feedback describing the template or layout pattern that the document matches.

The reading machine can include a feature that allows the user to direct the device to select 507 what region(s) to read. This navigation may be through a keypad-based input device or through speech navigation. If the user does not specify a region, the device automatically selects 506 which region(s) of the image to process. The selection is based on the layout model that has been chosen for the document. For a memo layout model, the selected regions typically start with a summary of the From/To block. For a book, the selected regions are usually limited to the text, and possibly the page number. The titles are typically skipped (except for the first page of a chapter).

The section of the image may undergo additional processing 508 prior to producing a binary or grayscale image for OCR. Such additional processing includes text angle measurement or refinement and contrast/brightness enhancement using filters chosen based on the size of the text lines. The image region is "read" 510 using OCR. The region may also look for patterns that correspond to logos, marks or special symbols. The OCR is assessed 512 by quality measures from the OCR module and by the match of the words against a dictionary, and grammar rules.

The reading machine determines if the text detection was satisfactory. If the text detection quality is satisfactory, the device starts reading 514 to the user using text-to-speech (TTS) software. The reading to the user can incorporate auditory cues that indicate transitions such as font changes and paragraph or column transitions. The auditory cues can be tones or words.

While reading the text to the user, the device continues to process 516 other available regions of the image. In general, text-to-speech processing is not as computationally intensive as OCR processing and visual pattern recognition, so CPU processing is available for additional image processing. If there are no additional regions available, the process 500 exits 520.

If the text detection quality is not good, the region may be reprocessed 530 to produce an image that may yield better optical character recognition. The processing may include strategies such as using alternate filters, including non-linear filters such as erosion and dilation filters. Other alternative processing strategies include using alternate threshold levels for binary images and alternate mapping of colors to grayscale levels.

If the result of the quality check indicates that text has been cut off at the boundaries of the region, the adjacent region is processed 532. The device tries to perform text stitching to join the text of the two regions. If it fails, the user is notified 534. If text stitching is successful, the contents of the regions are combined.

If the device fails to find readable text in a region, the user is notified and allowed to select other regions. The device gives the user a guess as to why reading failed. This may include, inadequate lighting, bad angle or position of the camera, excessive distance from the document or blurring due to excessive motion.

Once the device starts the text-to-speech processing, the reading machine checks to see if there are additional regions to be read. If there are additional regions to be read, the reading machine selects 540 the next region based on the layout model or, in the absence of a model match, based on simple top-to-bottom flow of text. If no additional regions remain to be processed, the device is finished reading.

A number of embodiments of the invention have been described. While the reading machine was described in the context for assisting the visually impaired, the device is general enough that it can be very useful for sighted individuals. The device gives anyone the ability to record the text information in a scene, but with the advantage over a digital camera that the text is converted by OCR immediately, giving the user confidence that the text has been captured in computer-readable form. The device also gives the user feedback on the quality of its ability to convert the image to computer-readable text, and may tell the user that the camera needs to be moved to capture the entire area of text. Once the text is computer-readable, and on an embodiment that is connected to the Internet, many other uses become possible. For example, theatre goers would be able to quickly scan in all the information in a movie poster and reference movie reviews, other movies those actors have been in, and related information.

Uses for the device by sighted individuals include the conversion to text of textual displays that cannot be easily scanned by a portable scanner, such as movie posters, billboards, historical markers, gravestones and engraved marks on buildings several stories up. For example, it may be advantageous to be able to quickly and easily record all of the information on a series of historical markers.

Because of the device's ability to provide quick feedback to the user about the quality of the OCR attempt, including specific feedback such as lighting, text being cut off, and text being too large or too small, the device has an advantage for those situations where access time to the text is limited.

In other embodiments, the device can automatically translate the text into another language, and either speak the translation or display the translated text. Thus, it will be understood that various modifications may be made without departing from the spirit and scope of the invention. Accordingly, other embodiments are within the scope of the following claims.

What is claimed is:

1. A computer program product tangibly embodied on a computer readable storage device, the computer program product for assisting a user of an electronic device to use the electronic device to perform a transaction on a machine, the computer program product comprises instructions for causing the electronic device to:
   receive an image or images of a portion of a machine that the user will use to perform the transaction;
   process the image or images to identify a pattern of controls on the machine; and
   announce to the user the name or function of one or more of the identified controls.

2. The computer program product of claim 1 wherein the computer program configures the electronic device to provide templates to recognize the machine, the machine selected from the group consisting of an automatic teller machine (ATM), e-ticket machine, electronic voting machines, and credit/debit point of sale machine.

3. The computer program product of claim 1 wherein the computer program configures the electronic device to recognize on the machine a layout of controls; and
   retrieve by the electronic device data including a representation of the layout of controls, the data retrieved by the electronic device from a knowledge base.

4. The computer program product of claim 1 wherein instructions to process the image, comprises instructions to:
   process the image to recognize the controls on the machine in the image of the machine by comparing the layout of the controls on the machine to a stored representation of the layout for the machine.

5. The computer program product of claim 1 wherein instructions to process the image, comprises instructions to:
   process the image with character recognition to recognize text on controls in the image of the machine;
   convert recognized text to speech; and
   cause the recognized text to be rendered as speech to provide input to the instructions to announce the text on the controls to the user.

6. The computer program product of claim 1 further comprising instructions to:
   process the image to detect the presence of a user-controlled pointing item over controls on the machine; and
   form instructions based on the presence of the pointing device to guide the user in operation of the machine.

7. The computer program product of claim 6 wherein instructions to guide the user in operation of the machine, further comprise instructions to:
   announce to the user the function of a control over which the user-controlled pointing item is placed.

8. The computer program product of claim 6 further comprising instructions to:
   determine whether the user controlled pointing item is over a control: and if not,
   announce to the user to move the user-controlled pointing item.

9. The computer program product of claim 6, further comprising instructions to:
   determine where the location of the user-controlled pointing item is in the image relative to a selected control in the image; and
   announce to the user instructions to guide the user to move the user-controlled pointing item relative to the selected control in the image.

10. The computer program product of claim 1 further comprises instructions to:
    retrieve a stored template to recognize the layout of controls on the machine; and
    process the image according to the stored template to navigate the user through use of the machine in accordance with the layout of controls provided by the template.

11. The computer program product of claim 1 further instructions to:
    process a signal from an RFID tag reader that receives a signal from an RFID tag on the machine to provide a specific description of the layout of controls on the machine.

12. A method of operating a device having a processor, the method comprising:
    receiving an image or images of a portion of a machine that the user will use to perform a transaction using the machine;
    processing by the processor the image or images to identify a pattern of controls on the machine; and
    announcing to the user the name or function of one or more of the controls.

13. The method of claim 12 further comprising;
    configuring the device to recognize the machine, the machine selected from the group consisting of an automatic teller machine (ATM), e-ticket machine, electronic voting machines, and credit/debit point of sale machine.

14. The method of claim 12 further comprising:
    processing the image to recognize text on controls in the image; and
    converting recognized text on the controls to speech to read aloud the text on the controls in the image to the user.

15. The method of claim 12 wherein the machine has a layout of controls the method further comprising:
    accessing a knowledge base to provide data to configure the device for a transaction mode with the machine, the data including data representing the layout of controls on the machine.

16. The method of claim 12 further comprising:
    processing the image to recognize the controls in the image; and
    identifying controls in the layout of the image of the machine by comparing the layout to a stored representation of the layout for the machine.

17. The method of claim 12 wherein announcing further comprises:
    processing the image or images to detect the presence of a user-controlled pointing item over controls on the machine; and
    announcing to the user the function of a control over which the user-controlled pointing item is placed.

18. The method of claim 17 further comprising:
determining whether the user controlled pointing item is over a control: and if not,
announcing to the user to move the user-controlled pointing item.

19. The method of claim 17 further comprising:
determining where the location of the user-controlled pointing item is in the image relative to a selected control in the image.

20. The method of claim 12 further comprising:
retrieving a stored template to recognize the layout; and
processing the image according to the stored template to navigate the user through use of the machine.

21. The method of claim 12 further comprising:
processing a signal from an RFID tag reader that receives a signal from an RFID tag on the machine to provide a specific description of the layout of controls on the machine.

22. An apparatus, comprising:
a processor device;
an image input device;
a computer readable medium storing a computer program product for assisting a user of the apparatus to use the apparatus to perform a transaction with a machine, the computer program product comprises instructions for causing the processor device to:
receive from the image input device an image or images of a portion of a machine that the user will use to perform the transaction;
process the image or images to identify a pattern of controls on the machine; and
announce to the user the name or function of one or more of the identified controls.

23. The apparatus of claim 22 wherein the computer program product is configured with data for the machine, the machine selected from the group consisting of an automatic teller machine (ATM), e-ticket machine, electronic voting machines, and credit/debit point of sale machine.

24. The apparatus of claim 22 wherein the machine has a layout of controls and the layout is included in data retrieved from a knowledge base.

25. The apparatus of claim 22 wherein instructions to process the image, comprises instructions to:
process the image to recognize the controls on the machine in the image of the machine by comparing the layout of the controls on the machine in the image to a stored representation of the layout for the machine.

26. The apparatus of claim 22 wherein instructions to process the image, comprises instructions to:
process the image with character recognition to recognize text on controls in the image of the machine; and
convert recognized text to speech to provide input to the instructions to announce the text on the controls to the user.

27. The apparatus of claim 22 wherein the computer program product further comprises instructions to:
process the image to detect the presence of a user-controlled pointing item over controls on the machine; and
form instructions based on the presence of the pointing device to guide the user in operation of the machine.

28. The apparatus of claim 22 wherein instructions to guide the user in operation of the machine, further comprise instructions to:
announce to the user the function of a control over which the user-controlled pointing item is placed.

29. The apparatus of claim 28 wherein the computer program product further comprises instructions to:
determine whether the user controlled pointing item is over a control: and if not,
announce to the user to move the user-controlled pointing item.

30. The apparatus of claim 28 wherein the computer program product further comprises instructions to:
determine where the location of the user-controlled pointing item is in the image relative to a selected control in the image.

31. The apparatus of claim 22 wherein the computer program product comprises instructions to:
retrieve a stored template to recognize a layout of controls on the machine; and
process the image according to the stored template to navigate the user through use of the machine.

\* \* \* \* \*